US011336886B2

(12) United States Patent
Wang et al.

(10) Patent No.: US 11,336,886 B2
(45) Date of Patent: May 17, 2022

(54) DISPLAY APPARATUS AND DISPLAY SYSTEM

(71) Applicant: BOE TECHNOLOGY GROUP CO., LTD., Beijing (CN)

(72) Inventors: Wei Wang, Beijing (CN); Xiaochuan Chen, Beijing (CN); Jiayao Liu, Beijing (CN); Xianqin Meng, Beijing (CN); Xiandong Meng, Beijing (CN); Jifeng Tan, Beijing (CN); Pengxia Liang, Beijing (CN); Jian Gao, Beijing (CN); Fangzhou Wang, Beijing (CN); Qiuyu Ling, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 287 days.

(21) Appl. No.: 16/484,976

(22) PCT Filed: Mar. 29, 2019

(86) PCT No.: PCT/CN2019/080385
§ 371 (c)(1),
(2) Date: Aug. 9, 2019

(87) PCT Pub. No.: WO2020/042605
PCT Pub. Date: Mar. 5, 2020

(65) Prior Publication Data
US 2021/0337182 A1    Oct. 28, 2021

(30) Foreign Application Priority Data
Aug. 28, 2018    (CN) .......................... 201810986338.7

(51) Int. Cl.
*H04N 13/337* (2018.01)
*H04N 13/351* (2018.01)
(Continued)

(52) U.S. Cl.
CPC ........... *H04N 13/337* (2018.05); *G02B 27/30* (2013.01); *G02B 27/44* (2013.01); *H04N 13/351* (2018.05)

(58) Field of Classification Search
None
See application file for complete search history.

(56) References Cited

U.S. PATENT DOCUMENTS

2018/0270476 A1\*  9/2018  Li ............................ G09G 5/14
2019/0004324 A1   1/2019  Wang et al.

FOREIGN PATENT DOCUMENTS

CN    202615044 U    12/2012
CN    204613517 U     9/2015
(Continued)

OTHER PUBLICATIONS

CN204613517 (Already of record): Translation.\*
(Continued)

*Primary Examiner* — Patricia I Young
(74) *Attorney, Agent, or Firm* — Syncoda LLC; Feng Ma

(57) ABSTRACT

A three-dimensional display apparatus providing a plurality of view points at a view zone includes a directional display structure including a plurality of first sub-pixels configured to display a plurality of first sub-images, and a plurality of second sub-pixels configured to display a plurality of second sub-images; a plurality of grating structures including a plurality of first grating structures configured to perform diffraction of light such that the first sub-images are directionally transmitted, and a plurality of second grating structures configured to perform diffraction of light such that the second sub-images are directionally transmitted; a reflector between the directional display structure and the view zone reflecting the first sub-images being directionally transmitted to a first view point and the second sub-images being directionally transmitted to a second view point, thereby (Continued)

displaying a three-dimensional image. The first and second view points can be different but within a same view zone.

18 Claims, 16 Drawing Sheets

(51) Int. Cl.
*G02B 27/30* (2006.01)
*G02B 27/44* (2006.01)

(56) References Cited

FOREIGN PATENT DOCUMENTS

| | | |
|---|---|---|
| CN | 205485086 U | 8/2016 |
| CN | 106199972 A | 12/2016 |
| CN | 206147186 U | 5/2017 |

OTHER PUBLICATIONS

International Search Report in Application No. PCT/CN2019/080385, dated May 31, 2019.
CN First Office Action in Application No. 201810986338.7, dated Jul. 9, 2020.

\* cited by examiner

DISPLAY APPARATUS AND DISPLAY SYSTEM

CROSS-REFERENCE TO RELATED APPLICATION

The present application claims priority to Chinese Patent Application No. 201810986338.7 filed on Aug. 28, 2018, the disclosure of which is hereby incorporated by reference in its entirety.

TECHNICAL FIELD

The present disclosure relates generally to the field of display technologies, and more specifically to a display apparatus and a display system.

BACKGROUND

In situations involving typical vision of a person, when observing an object from a distance, the monocular focal point and the binocular vergence point are the same, both being located over the object being observed.

SUMMARY

In a first aspect, a three-dimensional display apparatus configured to provide a plurality of view points at a view zone, the apparatus including:

a directional display structure comprising: a plurality of first sub-pixels configured to display a plurality of first sub-images, and a plurality of second sub-pixels configured to display a plurality of second sub-images;

a plurality of grating structures comprising a plurality of first grating structures configured to perform diffraction of light such that the plurality of first sub-images are directionally transmitted, and a plurality of second grating structures configured to perform diffraction of light such that the plurality of second sub-images are directionally transmitted;

a reflective mask between the directional display structure and the view zone, and configured to reflect each of the plurality of first sub-images being directionally transmitted to a first view point and reflect each of the plurality of second sub-images being directionally transmitted to a second view point, thereby displaying a three-dimensional image, the first view point and the second view point being within a same view zone, the second view point being different from the first view point.

In some embodiments, the directional display structure further includes:

a display panel comprising the plurality of first sub-pixels and the plurality of second sub-pixels, wherein the plurality of grating structures are disposed at a light-emitting side of the display panel; and a collimated backlight structure configured to provide collimated light for the display panel.

In some embodiments, the directional display structure further includes:

a display panel comprising the first plurality of sub-pixels and the second plurality of sub-pixels; and a collimated backlight structure configured to provide collimated light for the display panel;

wherein the plurality of grating structures are disposed between the display panel and the collimated backlight structure.

In some embodiments:

the collimated backlight structure is a side-entry collimated light structure including a light-guide panel and a collimated light source disposed along a side of the light guide panel; and the plurality of grating structures are disposed at a light-emitting side of the light guide-panel.

In some embodiments, the collimated backlight structure includes:

at least two light-guide panels arranged in layers; and a plurality of collimated light sources respectively placed along opposing sides of each light-guide panel;

wherein the plurality of grating structures are provided at a light-emitting surface of each light-guide panel;

a plurality of colors of the light emitted by the collimated light sources that correspond to different light guide panels are different; and the plurality of colors of light emitted by the plurality of the collimated light sources are cable of being mixed into white light.

In some embodiments, the collimated backlight structure further comprises a low-refractive-index bonding layer configured to bond adjacent light-guide panels.

In some embodiments:

the plurality of first sub-pixels are in one-to-one correspondence with the plurality of first grating structures; and the plurality of second sub-pixels are in one-to-one correspondence with the plurality of second grating structures.

In some embodiments, each of the plurality of first sub-pixels and each of the plurality of second sub-pixels are arranged alternately.

In some embodiments, the plurality of view points are arranged in a form of a straight line, a cross, a rectangle, or a star.

In some embodiments:

the display panel includes an upper polarizer configured at the light-emitting side of the display panel; and the plurality of grating structures are located at a light-emitting side or a light incident side of the upper polarizer.

In some embodiments:

the display panel further comprises a lower polarizer disposed adjacent to the plurality of first and second sub-pixels; and the lower polarizer is configured as a substrate of the display panel to thereby reduce a need for a glass substrate.

In some embodiments:

the plurality of view points include a first group of view points and a second group of view points;

among the grating structures corresponding to the first group, a grating orientation varies gradually between neighboring grating structures; and between the first group and the second group, a grating orientation varies substantially abruptly.

In some embodiments, the first group of view points and the second group of view points are respectively within different view zones.

In some embodiments, a grating orientation angle and a grating period are determined based on:

$$\vec{k}_o = n_o \frac{2\pi}{\lambda} \vec{r}_o;$$

$$\vec{k}_{in} = n_{in} \frac{2\pi}{\lambda} \vec{r}_{in};$$

-continued $$\vec{k}_G = \frac{2\pi}{g}\vec{r}_G;$$

$$\vec{k}_{in} + m*\vec{k}_G = \vec{k}_o \ (m = 0, \pm 1, \pm 2 \ ... \ );$$

$\vec{k}_{i3/o}$ is a ray wave vector, n is a refractive index of a corresponding medium, λ is a wavelength, $\vec{r}_{n/o}$ is a unit vector describing a direction of the light, and $\vec{k}_{i3G}$ is grating vector, $\vec{r}_G$ is a unit vector of a normal direction of grating lines, g is the grating period, and m is a diffraction order of the grating.

In some embodiments:

each of the plurality of first sub-pixels corresponds to at least two of the plurality of first grating structures;

the at least two of the plurality of first grating structures are configured to perform diffraction of light from one of the plurality of first sub-pixels such that a first sub-image displayed by the one of the plurality of first sub-pixels is transmitted to different view points;

each of the plurality of second sub-pixels corresponds at least two of the plurality of second grating structures;

the at least two of the plurality of second grating structures are configured to perform diffraction of light from one of the plurality of second sub-pixels such that a second sub-image displayed by the one of the plurality of second sub-pixels is transmitted to different view points.

In some embodiments:

at least two view points exist in a single pupil of an eye, the at least two view points corresponding to different associated sub-pixel groups;

different images are loaded for a set of primary first view points; and a common image is loaded for an adjacent set of secondary first view points.

In some embodiments, the optical component includes a lens or a freeform surface reflective panel.

In some embodiments:

the light emits at a smaller divergence angle according to the designed direction than as described by a lambert body;

the optical component forms a virtual image of the display panel over a virtual image plane; and a divergence angle of the light at the virtual image plane is smaller than a divergence angle of the light at the display panel.

In some embodiments:

the display panel includes a color film layer; and the plurality of grating structures are placed at a light-emitting side of the color film layer.

In some embodiments, the plurality of grating structures comprise at least one of an etched grating structure having upright gate lines, an etched grating structure with tilted gate lines, or a Bragg grating structure formed by an exposed holographic material.

In another aspect, a display system is provided, including two of the abovementioned display apparatuses, wherein the two display apparatuses respectively correspond to a left eye and a right eye of a user.

In some embodiments, the display system further includes a camera configured to track the user eye to facilitate refreshing view point information in real time to thereby correcting error information resulting from the user eye movement between view points.

In some embodiments, the display apparatuses are configured to adapt to the user's uncorrected eye vision.

In some embodiments, the directional display structure comprises at least one of a liquid crystal display (LCD) panel, a light-emitting diode (LED) display panel, or an organic LED (OLED) display panel.

In some embodiments, a monocular focal distance of one of the two display apparatuses corresponding to the left eye or right eye and a binocular vergence distance of the two display apparatuses are substantially equal.

In some embodiments, the optical component has an adjustable transmissivity.

In some embodiments, the display system further includes a camera configured to capture images of an actual scene, wherein the directional display structure is configured to display both the captured images of the actual scene and an virtual image.

Other embodiments and implementations may become apparent in view of the following descriptions and the attached drawings.

BRIEF DESCRIPTION OF THE DRAWINGS

To more clearly illustrate some of the embodiments, the following is a brief description of the drawings.

The drawings in the following descriptions are only illustrative of some embodiments. For those of ordinary skill in the art, other drawings of other embodiments can become apparent based on these drawings.

DETAILED DESCRIPTION

Figure 1:
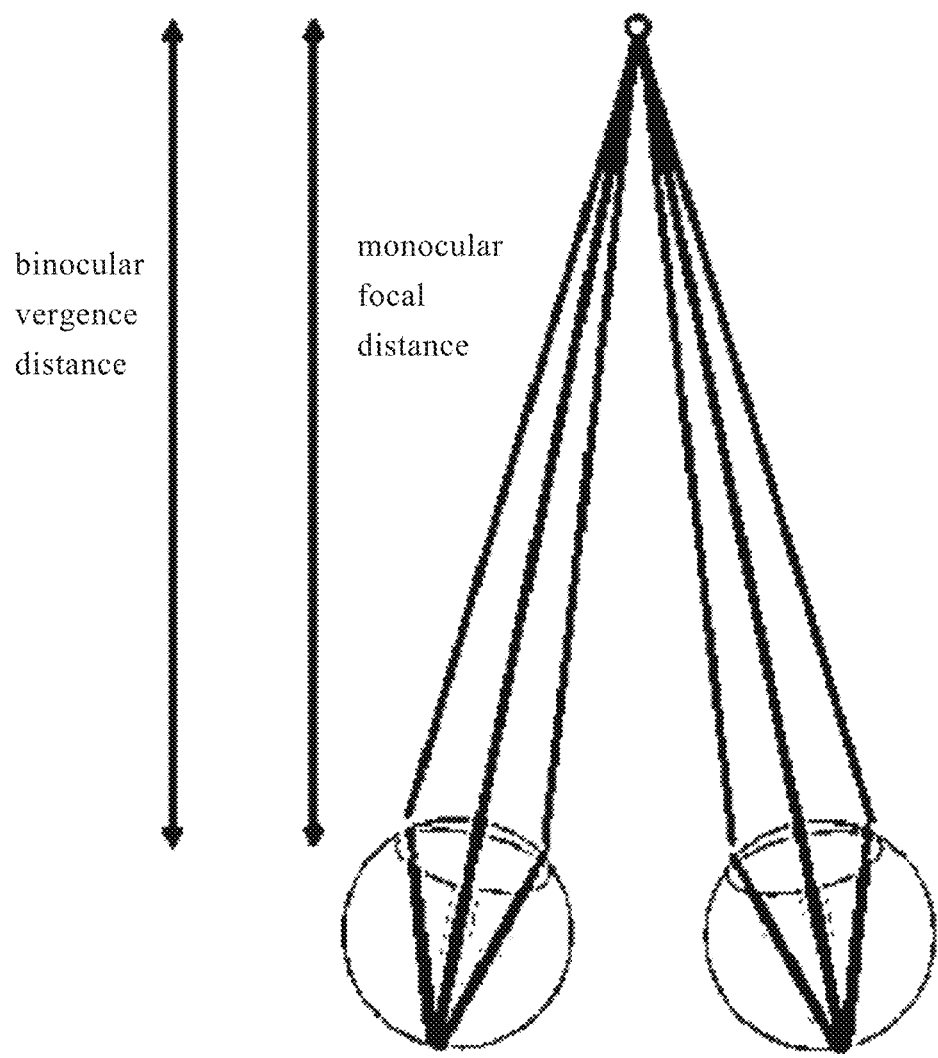
FIG. 1 is a schematic view of monocular focal point or distance and binocular vergence point or distance in a normal vision or sight scenario.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or other structure is referred to as being "on" or extending "onto" another element, it can be directly on or extend directly onto the other element or intervening elements may also be present. In contrast, when an element is referred to as being "directly on" or extending "directly onto" another element, there are no intervening elements present.

Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "horizontal" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Various embodiments of the present disclosure provide a display apparatus and a display system, such that uniformity between the monocular focal distance and the binocular vergence distance can be achieved in a near-eye display. In prior art systems, a problem in existing parallax 3D technologies existed in which viewers could feel uncomfortable or dizzy from previous incongruities or difference in focal distances between monocular and binocular can be effectively solved.

For purposes of clarity, the term "vergence" may be used to describe the simultaneous movement of both eyes in opposite directions to obtain or maintain single binocular vision.

However, in existing parallax 3D technologies, because the display screen only provides binocular parallax image information of a light field representing the object to be observed and does not provide light field information such as corresponding light direction needed for monocular focusing, the monocular focal point is always on the display screen, however, the binocular focus will be converged over a virtual object displayed at a certain distance from the display screen.

Consequently, due to this binocular parallax image information, it can cause an unnatural feeling due to the incongruities between the monocular focal point and the binocular vergence distance which can cause the viewer to feel dizzy or uncomfortable.

Due to these visual incongruities and decreased viewer comfort and experience can then limitations of the application of parallax 3D technologies in virtual reality and augmented reality have been recognized as they inhibit the natural feel of virtual and augmented reality.

When a creature with binocular vision looks at an object, the eyes must rotate around a horizontal axis so that the projection of the image is in the center of the retina in both eyes.

For example, in order to look at an object up close, the eyes rotate towards each other, i.e. converge, while to look at an object farther away they rotate away from each other, i.e. diverge.

However, incongruities between the individual focal distance of an individual eye and the vergence focal point as related to both eyes can cause the dizzying sensation, similar to the feeling some people get when looking at an object cross-eyed.

In a first aspect, a three-dimensional display apparatus is provided. The 3-D display apparatus can be configured to provide a plurality of view points at a view zone.

Figure 3A:
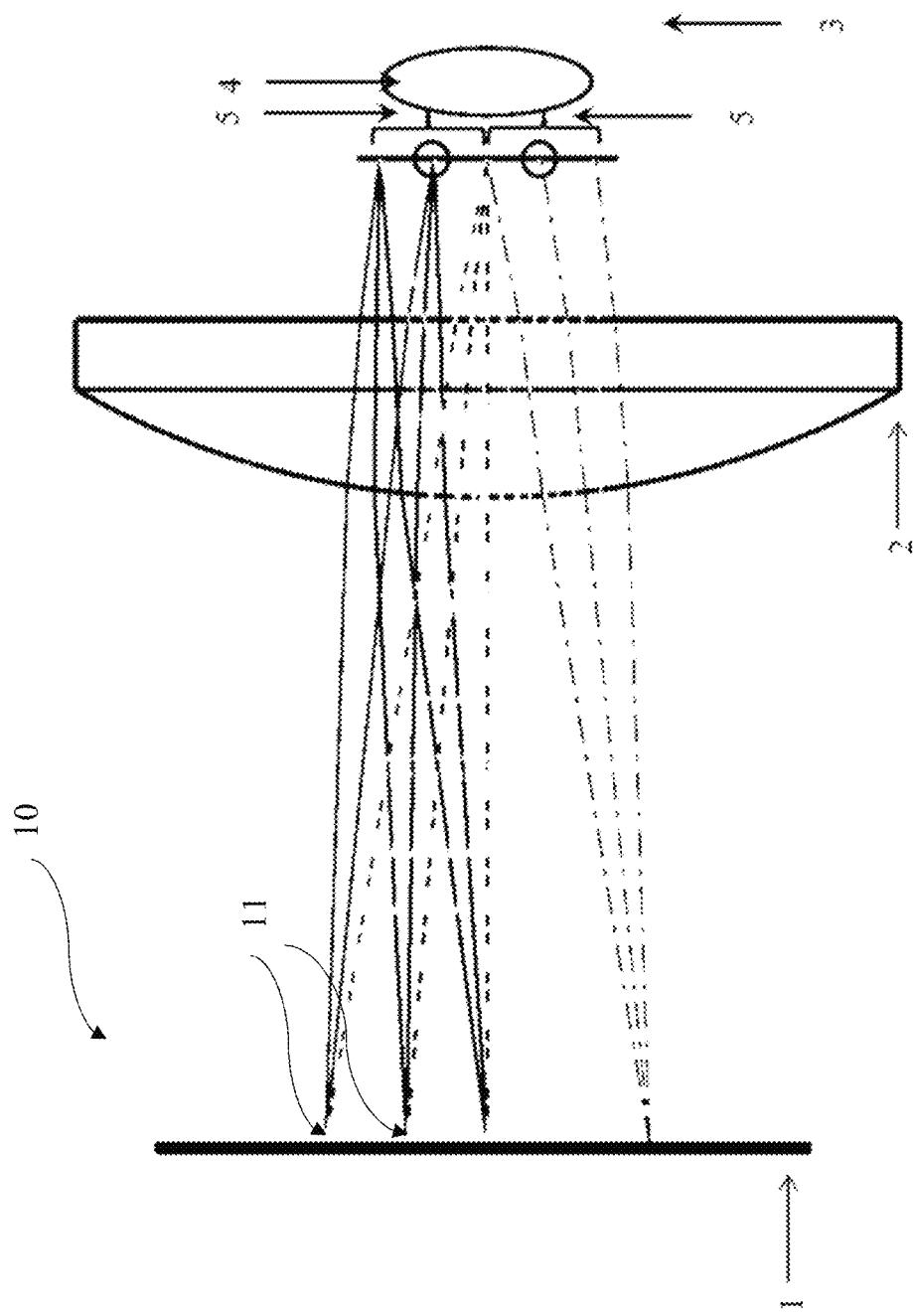
FIG. 3A is a schematic structural view of a display apparatus according to some embodiments of the present disclosure.

As illustrated in FIG. 3A, the 3-D display apparatus 10 can include a directional display structure 1. The directional display structure can include, for example, a plurality of first sub-pixels configured to display a plurality of first sub-images, and a plurality of second sub-pixels configured to display a plurality of second sub-images.

The 3-D display apparatus can further include an optical component 2. In some embodiments, the optical component 2 can be located at a light-emitting side of the directional display structure 1.

The optical component 2 can be configured to converge light at a plurality of points as the light reaches the emitting side of the optical component.

Figure 4A:
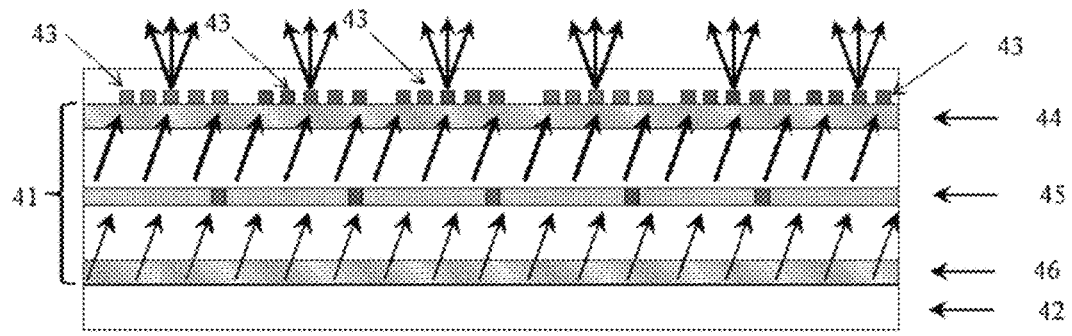
FIG. 4A is a schematic view of a directional display structure according to some embodiments of the present disclosure.

As illustrated in FIG. 3A and FIG. 4A, in some embodiments, the 3-D display apparatus can include a plurality of grating structures 43. The plurality of grating structures 43 can include, for example, a plurality of first grating structures configured to perform diffraction of light such that the plurality of first sub-images are directionally transmitted, and a plurality of second grating structures configured to perform diffraction of light such that the plurality of second sub-images are directionally transmitted.

In some embodiments, the directional display structure 1 can include a plurality of sub-pixels 11, and also the plurality of grating structures 43 corresponding to each sub-pixel 11. In some other embodiments, the plurality of grating structures 43 are not necessarily part of the directional display structure 1.

As illustrated in FIG. 4A and FIG. 3A, the plurality of grating structures 43 can be configured to emit light according to at least one preset light-emitting direction, such that the light emitted from the directional display structure 1 can reach at least two first view points 5 after passing through the optical component 2, the distances between neighboring first view points 5 are not larger than a diameter of a pupil of a human being.

The schematic structural view of the display apparatus 10 according to some embodiments of the present disclosure as illustrated in FIG. 3A can include the directional display structure 1 and the optical component 2 located at the light-emitting side of the directional display structure 1. As shown, the optical component 2 can be employed to form an image from the light that reaches the optical component 2.

The directional display structure 1 can also include the plurality of sub-pixels 11 and the plurality of grating structures 43 in the specific example illustrated in FIG. 3A. It will be appreciated that the grating structures 43 can have various configurations, some of which are illustrated in FIG. 4A, FIG. 4B, FIG. 4C, FIG. 5A, FIG. 5B and FIG. 5C.

For example, each pixel 11 can have an associated grating structure 43. Further, each of the plurality of grating structures 43 can be configured to emit light according to at least one preset light-emitting direction, such that the light emitted from the directional display structure 1 can reach at least two first view points 5 after passing through the optical component 2.

In some embodiments, the distances among adjacent first view points 5 are equal to or less than a diameter of a pupil 4 of an eye 3. Generally, the diameters of human pupils are between 2 mm and 5 mm. In some embodiments, in order to correspond to an average pupil diameter, the distances among adjacent first view points 5 can in some instances be set at a value of 2.5 mm, for example.

According to some embodiments, it will be understood that a sub-pixel is the smallest unit of a display unit that can be controlled independently. For example, for a liquid-crystal display (LCD), sub-pixels can refer to red (R) sub-pixels, green (G) sub-pixels, or blue (B) sub-pixels that can be controlled independently.

Each sub-pixel 11 can be provided with a corresponding grating structure 43, that is, each sub-pixel 11 corresponds to an underlying grating structure 43.

In some embodiments, the displays are not limited to LCDs, and can employ other types of displays, such as light-emitting diode (LED) displays, organic LED (OLED) displays, micro LED (µLED) displays, quantum-dot LED (QLED), etc. The display apparatus can adopt the form of a VR/AR device, a head-mount display (HMD) device, a head-up display (HUD) device, smart eyewear (e.g., glasses), etc.

Controlling the pixels can be implemented with thin-film transistors (TFTs), or other electronics configuration, such as flexible electronics.

In some embodiments, each grating structure 43 can similarly correspond to at least one preset light-emitting direction, wherein each grating structure 43 can then be employed so as to cause light that has entered the grating structure 43 to be emitted in a direction corresponding to a desired or preset light-emitting direction.

For example, each grating structure 43 can be configured to emit light according to at least one corresponding preset light-emitting direction. As a result, the light emitted from the directional display structure 1 can reach at least two first view points 5 after passing through the optical component 2.

In other words, the light emitted from some grating structures 43 can ultimately reach a first view point among the at least two first view points 5, and the light emitted from some other grating structures 43 can ultimately reach another of the first view points among the at least two first view points 5.

By having various sub-pixels 11 and corresponding grating structures 43 that direct light at one of the first view points 5, while various sub-pixels and corresponding grating structures direct light at an alternative adjacent first view point 5, and due to the fact that the distances between two adjacent first view points 5 are less than or equal to the diameter of a pupil 4 of an eye 3, different images can be projected to the adjacent first view points 5.

In this manner, a single eye can be presented with two parallax-free images having common focal and vergence focal points, so as to allow the eye see at least two parallax-free images at the same time through at least two view points in the pupil. For the same scene displayed. In this manner, the display apparatus as illustrated herein can achieve the uniformity of monocular focal distance and binocular vergence distance, as a result, the problem in existing parallax 3D technologies that often causes viewers to feel dizzy is effectively solved.

In some alternative embodiments of the present disclosure, the subpixel-grating apertures corresponding to different view points can be independently controlled. As a result, preset light-emitting directions can be independently controlled for each of the grating structures 43 corresponding to each sub-pixel; meanwhile, in order to achieve uniform distribution of images corresponding to different view points over the panel, the sub-pixels corresponding to the at least two first view points 5 can then be arranged alternately.

Figure 7:
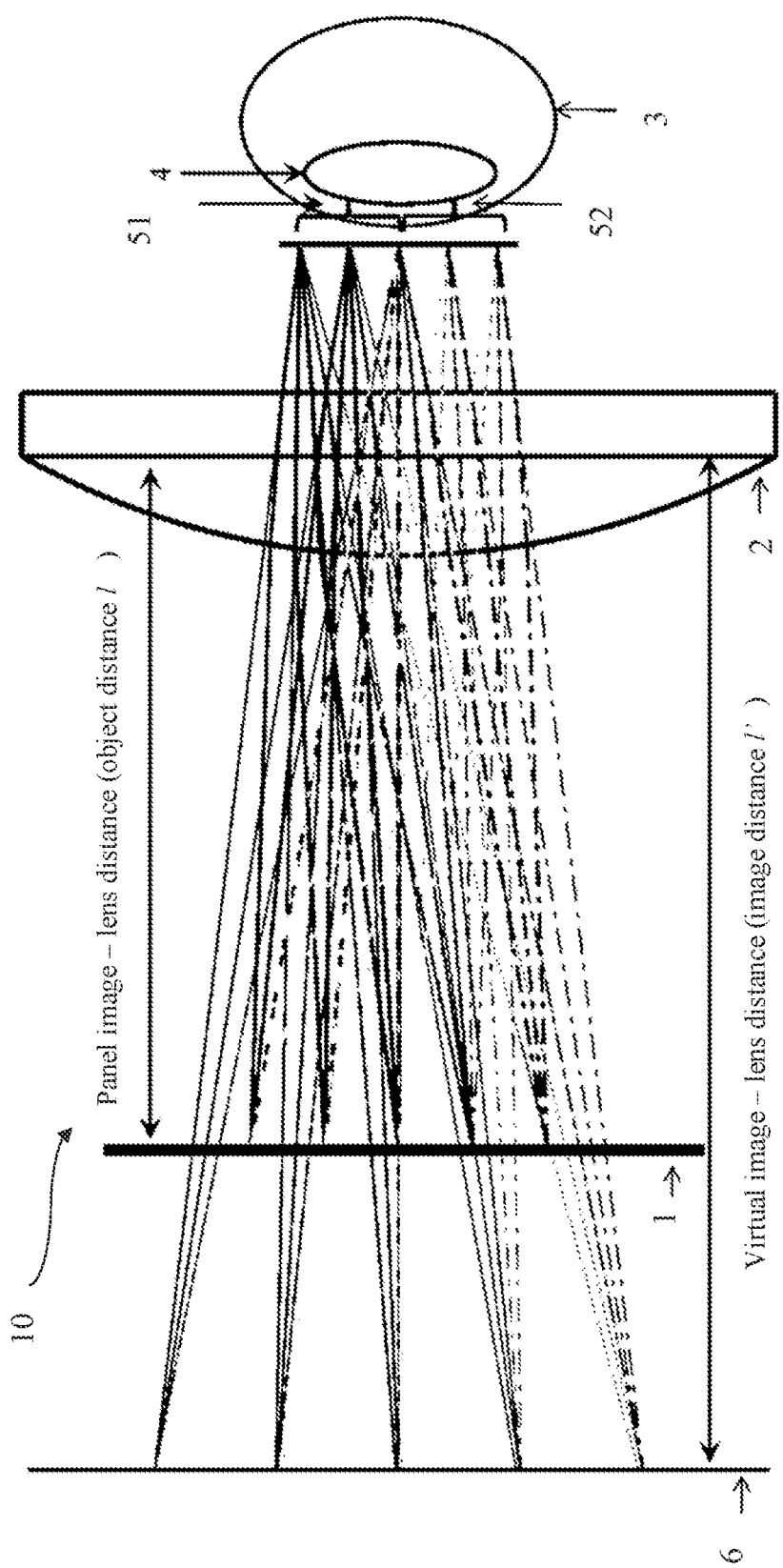
FIG. 7 is a light path diagram of a display apparatus according some embodiments of the present disclosure.

For example, and as illustrated in FIG. 7, if the sub-pixels can be arranged in the form of an array, when there are two first view points 51 and 52, the light emitted from the grating structures 43 corresponding to the sub-pixels of rows of odd number will emit light grated in a manner so as to be directed at a first view point 51, whereas the light emitted from the grating structures 43 corresponding to the sub-pixels of rows of even number will emit light grated in a manner so as to be directed at another or adjacent first view point 52.

In other words, the light emitted from the grating structures 43 corresponding to the sub-pixels of columns of odd number will ultimately be focused so as to reach a first view point 5B among the, while the light emitted from the grating structures 43 corresponding to the sub-pixels of columns of even number will ultimately be focused so as to reach another or an adjacent first view point 5B.

The specific method of alternate distribution of the sub-pixels may be selected according to practical needs, and as such there are no limitations on a particular number of sub-pixels and focal points associated therewith. The alternate distribution of the sub-pixels corresponding to the at least various first view points 5 can enable the uniform distribution of the images corresponding to different first view points 5 over the whole panel.

According to some embodiments of the present disclosure, if the sub-pixels are arranged in the form of an array, when there are four first view points that are arranged in the form of two rows and two columns, in the matrix where the sub-pixels are located therein, the sub-pixels corresponding to first view points of the same row can then be arranged in an alternating fashion within the same row, in the matrix where the sub-pixels are located in, the sub-pixels corresponding to first view points of the same column can then be similarly arranged in an alternating fashion in the same column.

Figure 3B:
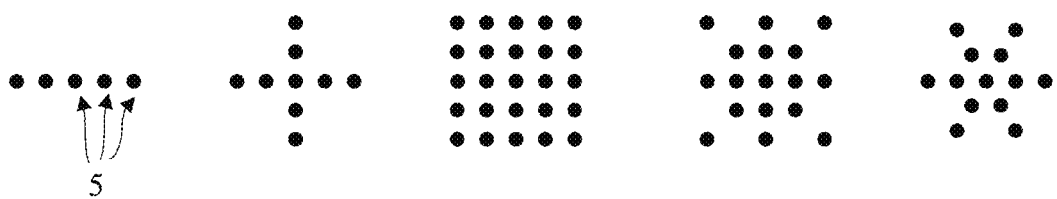
FIG. 3B is a view point arrangement diagram according to some embodiments of the present disclosure.

In yet additional embodiments, the various first view points 5 may be arranged so as to form a straight line, a cross, a rectangle or a star as shown in FIG. 3B, however, there are no limitations herein, except as constrained by the diameter of a user's eye, and the number of sub-pixels 11 provided on the directional display structure 1 which would be required to form the requisite parallax-free image.

According to some additional embodiments of the present disclosure, and as discussed above, while each sub-pixel 11 corresponds to a grating structure 43, a corresponding aperture of each sub-pixel is similarly corresponded with a grating structure 43. This grating structure 43 allows for light emission angles such that the light-emitting from a particular grating structure 43 does not enter the corresponding regions of adjacent view points particularly after passing through the optical component 2.

If the optical component 2 is provided as a lens, the grating structure can have a preset light emitting direction and an associated diffusion range of the speckle which will allow for the emission of the light, the focusing through the lens at a particular focal point, but will not be visible from an adjacent focal point due to the grating structure 43 and the focal distances.

In some instances, due to sub-pixel aperture diffraction and the divergence angle of the collimated backlight structure 42, the light emitted by the aperture of a single subpixel-grating is not generally completely collimated. Rather, the light can have a certain divergence angle. Therefore, when the corresponding light reaches the corresponding view point, what is formed is not a point, but can instead be described as a speckle with a finite radius.

According to some embodiments of the present disclosure, the optical component 2, e.g., lens, can then be arranged so as to convert a light cone with a larger divergence angle over the display structure into a light cone with a smaller divergence angle over the virtual image plane of the display structure corresponding to the same diffused speckle over the pupil 4.

As a result, the adjustment accuracy of the light angle of the light field display can be largely improved, that is, the accuracy of the light-emitting angle of the sub-pixels of the directional display structure 1 can be corrected through the lens, therefore. In this manner, the light field display effect can be greatly improved.

In yet additional embodiments of the present disclosure, the grating structure 43 can be provided with at least two grating substructures 43, wherein the grating periods of the multiple grating substructures 43 can be different.

In such embodiments, each grating substructure 43 can then correspond to a preset light-emitting direction; the multiple grating substructures 43 can then be arranged or employed so as to allow light emissions only according to the preset light-emitting directions corresponding to the grating substructures 43, so that the light emitted by the directional display structure 1 will reach at least two second view points after passing through the optical component 2.

In this embodiment, the second view points can be included in the first view points, the distances among adjacent view points can then be larger than a diameter of a pupil of a human eye. In this manner, different images can then be loaded for adjacent first view points, and the sub-pixels corresponding to adjacent first view points can then be different.

In other words, when the sub-pixels corresponding to adjacent first view points are the same, the images loaded by two adjacent first view points that fall into the pupil 4 would also be the same, and monocular focus 3D effect can then not be achieved. As a result, adjacent second view points can then be loaded with the same image, and then when the eyes move, the same pixel information can be seen. In this manner, for this instance the eye box range, or particular placement of the user's eye with respect to the optical component 2 can be enlarged.

Figure 3C:
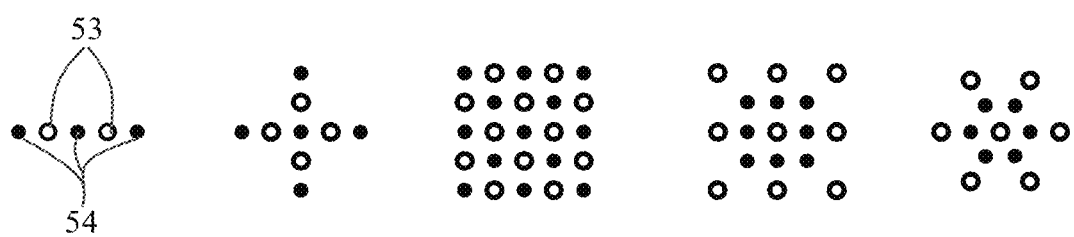
FIG. 3C is another view point arrangement diagram according to some embodiments of the present disclosure.

It should be noted that in this embodiment, and as illustrated in contrast between FIGS. 3B and 3C, the first view points can be arranged in an array or a matrix, wherein all the view points are common and appropriately spaced. However, the view points can alternatively include one or more sets of primary view points 53 and secondary view points 54, as illustrated in FIG. 3C, wherein the primary view points 54 can be associated with a first image or a first aspect of an image, and one or more sets of secondary view points 54 associated with a second image or a second aspect of an image.

In this embodiment, the primary view points are divided from the secondary view points. However, they could be focused so as to overlap on each other in the array. A distinction between the primary view points and the secondary view points is made for the purpose to conveniently describing that while having common characteristics as the first view points, they can be bifurcated in a way that various view point sets, i.e., primary vs secondary, can each have associated aspects of an overarching image that they combine when viewed to make.

According to some embodiments of the present disclosure, an aperture of a single sub-pixel can correspond to a plurality of grating substructures 43. In order to enlarge the field of view, i.e. the eye box, and improve the utilization efficiency of the pixel, a design is contemplated herein in which an aperture of a single sub-pixel can correspond to a plurality of grating substructures 43.

In this configuration, the grating structures 43 corresponding to apertures of different sub-pixels can be provided so as to achieve a particular light field display. In this manner, different grating substructures 43 of different grating periods over an aperture of the same sub-pixel can then copy the information over the same sub-pixel to adjacent view points, which, as a result, allows the field of view to be enlarged and continuous viewing along with the movement of eyes is achieved.

With reference to FIG. 3C, as illustrated herein double view point group information can be employed as an example for illustration. As shown herein, the solid lines in the figure correspond to a particular group of light field information, whereas the dotted lines correspond to another group of light field information or view points, as discussed above, different solid lines and hollow lines are respectively realized by the plurality of grating substructures 43 of different grating periods corresponding to an aperture of a single sub-pixel.

In order to prevent the false information brought by the reversal of image information when the eye 3 moves among the view points, eye-tracking technologies may also be adopted, view point information can be updated in real time (the position of the view point is still unchanged, it is the image information projected to the view point that is updated) to make the correction. The updating of view point information can be achieved through adjusting the light field image loaded over the display structure, the updated correct view point information is added to the view point that is right in front of the eye.

For the cases where there are more than two sets of view point group information, similar implementations may be adopted.

In some embodiments, the directional display structure further includes a display panel comprising the first plurality of sub-pixels and the second plurality of sub-pixels, wherein the plurality of grating structures are disposed at a light-emitting side of the display panel; and a collimated backlight structure configured to provide collimated light for the display panel.

In some embodiments, the plurality of grating structures can be disposed between the display panel and the collimated backlight structure.

Figure 4B:
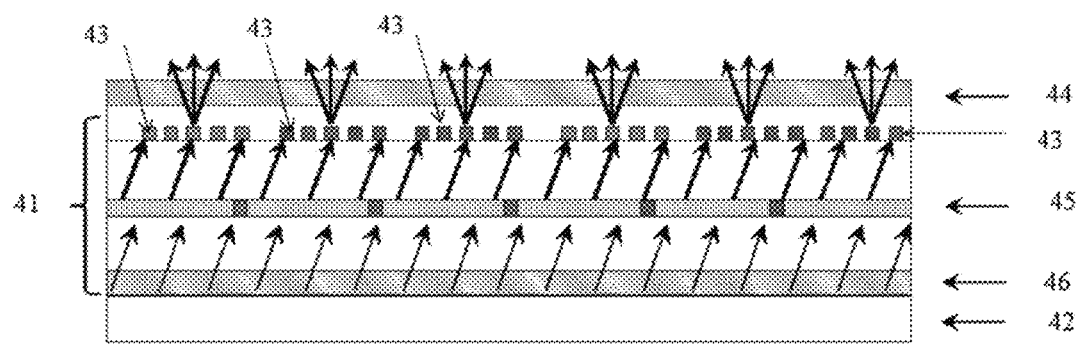
FIG. 4B is a schematic view of a directional display structure according to some embodiments of the present disclosure.
Figure 4C:
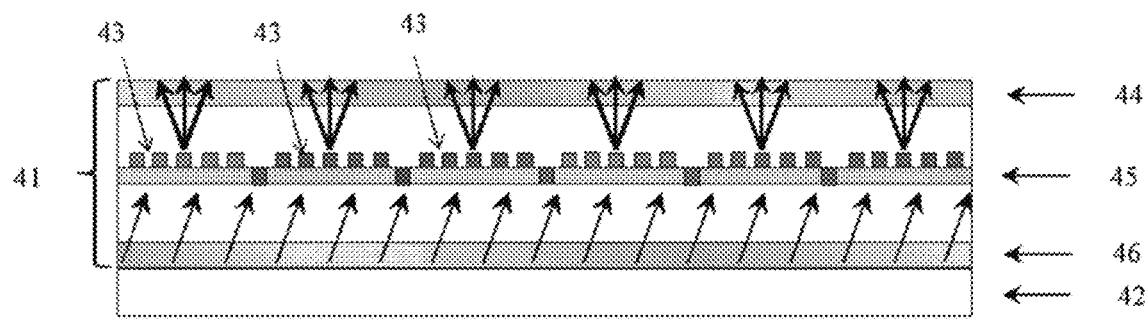
FIG. 4C is a schematic view of a directional display structure according some embodiments of the present disclosure.

For example, as illustrated in FIGS. 4A-4C, the directional display structure 1 can include a collimated backlight structure 42 and the display panel. The sub-pixels can be disposed at the display panel, and the grating structures 43 can be arranged at the display panel on the light-emitting side of the display panel or over the collimated backlight structure 42.

For example, two types of directional display structures 1 can be provided. The first type of directional display structure 1 includes a collimated backlight structure that combines deflecting grating. In these embodiments, the light emitted by the collimated backlight structure is modulated by the LCD prior to being diffracted by the deflecting grating to generate the required preset light-emitting direction.

For the structure that combines collimated backlight structure and deflecting grating, the grating structures 43 may be provided or placed outside the LCD panel 41, as shown in FIG. 4A, or directly placed over the substrate of the LCD panel 41, as shown in FIG. 4B, then covered with other filling material. In this case, the polarizer will be located outside the grating structures 43. In order to reduce the depolarization effect of the grating structures 43, the polarizer may also be placed inside the liquid crystal box.

In yet additional embodiments, the grating structures 43 may also be provided or placed over other base material before they are bonded over the substrate of the LCD panel 41. The grating structures may also be placed inside the LCD panel 41, over or under the color film, that is, the display panel comprises the color film layer 45.

In some such embodiments, the grating structures 43 can then be placed at the light-emitting side or light incident side of the color film layer 45. In FIG. 4C, the grating structures 43 are placed at the light-emitting side of the color film layer 45.

According to some embodiments of the present disclosure, as shown in FIG. 4A, the display panel includes the upper polarizer 44 provided about or at the light-emitting side of the display panel, the grating structure 43 are located at the light-emitting side of the upper polarizer 44. In such instance, the light can be configured or designed so as to pass the polarizer first before it passes the grating structures 43, as a result, the depolarization effect of the grating structures 43 will not influence display effect.

In some embodiments, the collimated backlight structure is a side-entry collimated light structure including a light-guide panel and a collimated light source disposed along a side of the light guide panel; and the plurality of grating structures are disposed at a light-emitting side of the light guide-panel.

Figure 5A:
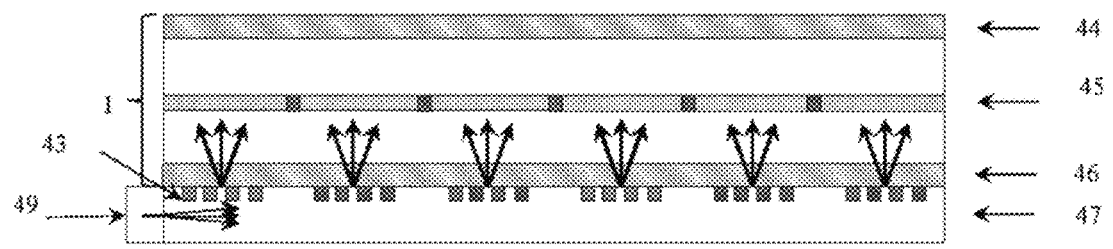
FIG. 5A is a schematic view of another directional display structure according to some embodiments of the present disclosure.
Figure 5B:
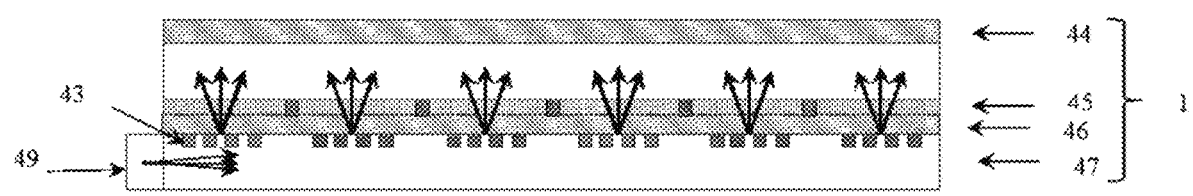
FIG. 5B is a schematic view of the other directional display structure according to some embodiments of the present disclosure.
Figure 5C:
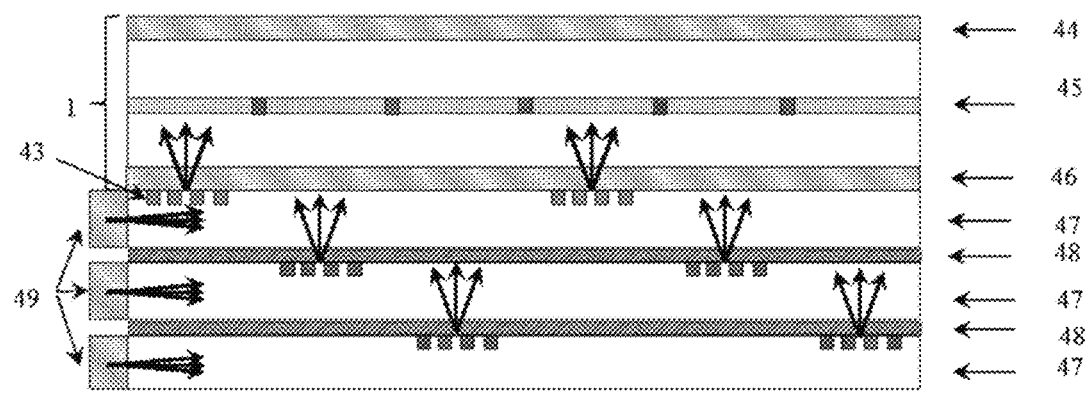
FIG. 5C is a schematic view of the other directional display structure according to some embodiments of the present disclosure.

For example, as illustrated in FIG. 5A, FIG. 5B and FIG. 5C, the second type of the directional display structure 1 can include a side-entry wave-guide grating. In this embodiment, the light-obtaining grating structures 43 which are located over the surface of the wave-guide layer, in other words, the surface of the light-guide panel 47,will enable the collimating light transmitted in the wave-guide layer to be diffracted and emit according to the preset directions corresponding to the grating structures 43, after being modulated by the LCD panel 41, and the corresponding images are generated.

For side-entry waveguide gratings, the grating structures 43 may be arranged or placed over the wave-guide surface, as shown in FIG. 5A and FIG. 5C, or it may be formed through direct etching of the wave-guide surface. In some instances, the surface of the grating structures 43 may be exposed to the air, in which case, the grating structures 43 can then be integrated with the LCD panel 21 through alignment and bonding.

Alternatively, the surface of the grating structure 43 may also be coated with a protection layer with low refractive index, in which case the grating structures 43 can integrated with the LCD panel 41 through alignment and bonding, or after the protection layer with low refractive index is coated, the grating structures 43 may be directly employed as the substrate of the LCD panel 41 (as shown in FIG. 5B) for consequent manufacturing of the LCD panel 41.

The material of the grating structures 43 may comprises a transparent material such as $SiO_x$, $SiN_x$ or resin, in order to increase diffraction efficiency. Other materials may also be adopted, and there are no limitations herein.

The grating periods of the grating structures 43 are determined by the preset light-emitting direction and the color of the light.

Figure 6:
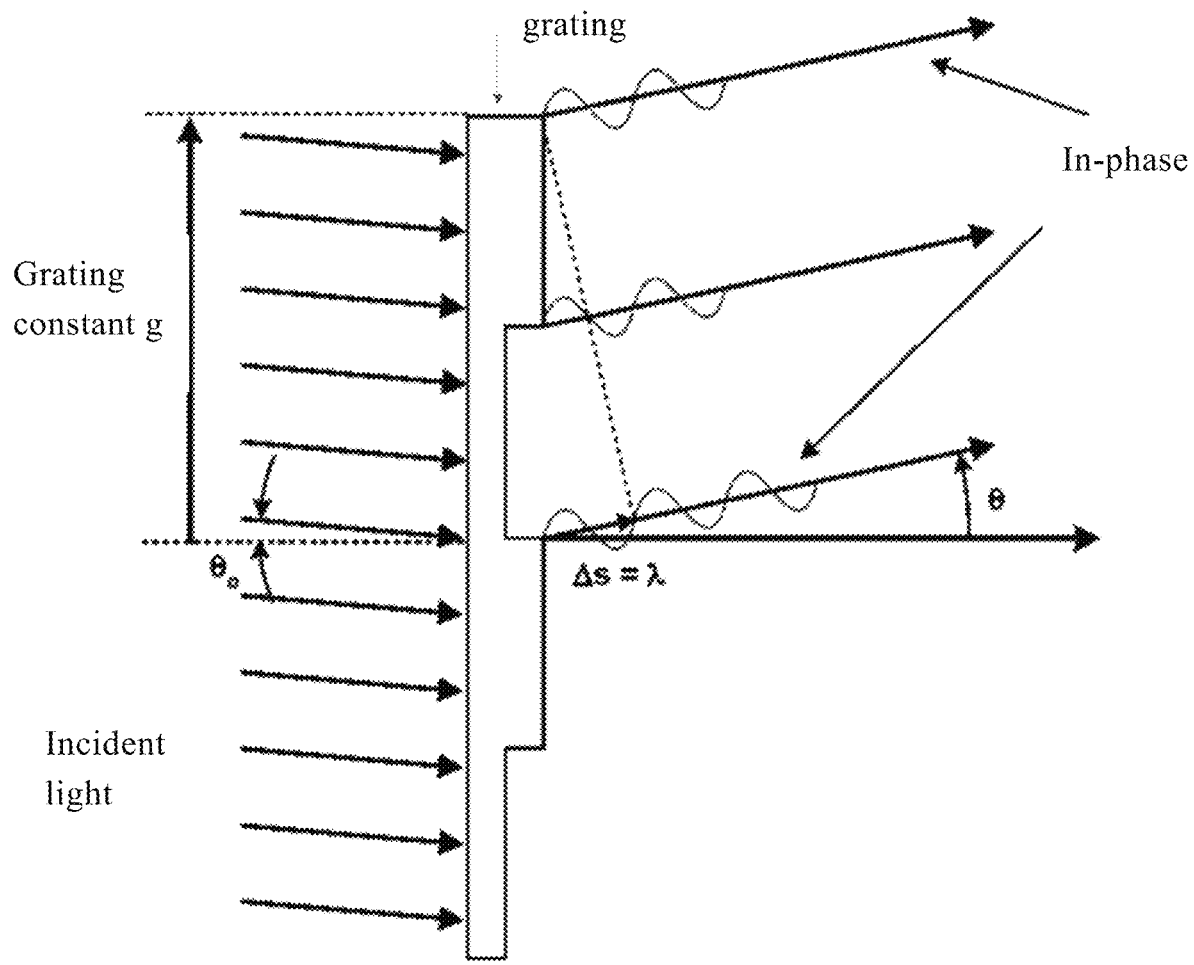
FIG. 6 is a schematic view of a grating diffraction pattern according to some embodiments of the present disclosure.

As shown in FIG. 6, the diffraction angle θ of the m level diffraction wave of the grating is determined by the grating period g, the wavelength of the incident wave λ and the incident angle $\theta_0$, the grating period g may be determined through the following formula:

$$n_{diff}*\sin\theta - n_{in}*\sin\theta_0 = m\lambda/g \ (m=0, \pm1, \pm2 \dots). \quad (1)$$

It will be appreciated that the diffraction angle θ is related to the position of the sub-pixel, the position of the first view point 5 and the deflection angle of light by the optical component 2, wherein the wavelength λ of the incident light is the wavelength of the light transmitted from each sub-pixel into the grating structure 43.

For collimated backlight structure combined with deflection grating, the incident angle $\theta_0$ is the light-emitting angle of the collimated backlight structure 42, for side entry wave-guide grating, the incident angle $\theta_0$ is the transmission angle of the light source in the light guide panel 47 after it enters the light guide panel 47, $n_{in}$ is the refractive index of the medium where the incident wave is located, $n_{diff}$ is the refractive index of the medium where the outgoing wave is located.

Generally, the grating structures 43 are configured to be first of level diffraction, wherein in some instances the duty ratio is 0.5. However, in practical applications, the value of the duty ratio may be deviated from 0.5, for example, for the reasons of adjusting the strength of the outgoing light, balancing the difference in brightness levels at different locations of the display panel or conditions of the process, and so on.

The heights of the grating structures 43 are configured to have a range of 100 nm-1000 nm, in order for it to be easier to be implemented in the process, the heights of the grating structures 43 at the same film layer over the whole display component can be the same.

In addition to the aforementioned etched grating structure with upright gate lines, the grating structure may also be an etched grating structure with tilted gate lines or a Bragg grating structure formed by exposed holographic material, and so on, as a result, the diffraction efficiency of the grating structures can be improved and stray light can be reduced.

It will be understood that while light is transmitted among different film layers at a certain angle, there is a certain distance between the direction portions, that is, each grating of the grating structures 43, of the grating structures 43 and the color film layer 45 of the LCD panel 41, which allows for accurate alignment of the sub-pixels of the LCD panel 41 and the direction portions of the grating structures 43 is an issue.

The sub-pixels and the direction portions of the grating structures 43 may need to be configured slightly staggered, because the light will not emit from the color film layer 45 vertically and it will be titled at a certain angle. As such, the direction portions cannot be configured directly above the sub-pixels, when designing the direction portions of the grating structures 43.

According to some embodiments of the present disclosure, the grating structure can include at least one of an etched grating structure with upright gate lines, an etched grating structure with tilted gate lines, or a Bragg grating structure formed by exposed holographic material, as a result, the diffraction efficiency of the grating can be improved and stray light can be reduced.

According to some embodiments of the present disclosure, as shown in FIG. 5A, FIG. 5B and FIG. 5C, the collimated backlight structure 12 can be provided as a side entry collimated backlight structure, including the light-guide panel 47 and the collimated light sources 49 provided at the side of the light-guide panel 47, the grating structures 43 are provided over the light-emitting surface of the light-guide panel 47.

Specifically, as shown in FIG. 5A, FIG. 5B and FIG. 5C, for side entry wave-guide grating, side entry collimated light sources 49 are adopted. The collimated light sources 49 may be manufactured by semi-conductor laser chips of red, green and blue color after going through the processes of blending, decoherence, beam-expansion and collimation. The collimated light sources may also be manufactured by light-emitting diode (LED) having red, green, and blue color after going through the processes of blending, beam-expansion and collimation.

Alternatively, the collimated light source can be manufactured by white light LED after going through the processes of beam-expansion and collimation. In the embodiments shown, the system can include a lower polarizer 46.

In some embodiments, the lower polarizer 46 can act as a lower substrate of the display panel, and therefore reduce the need for a glass substrate in the manufacturing of the display panel.

In some embodiments, the collimated backlight structure includes: at least two light-guide panels arranged in layers; and a plurality of collimated light sources respectively placed along opposing sides of each light-guide panel. The plurality of grating structures can be provided at a light-emitting surface of each light-guide panel.

A plurality of colors of the light emitted by the collimated light sources that correspond to different light guide panels can be different. The plurality of colors of light emitted by the plurality of the collimated light sources are cable of being mixed into white light.

For example, as illustrated in FIGS. 5A-5C, the collimated backlight structure 42 can include three light-guide panels 47 provided in layers and the collimated light sources 49 can then be provided at the side of each light-guide panel 47, the grating structures 43 can then be provided over the light-emitting surfaces of all light-guide panels 47.

In this embodiment, the colors of the light emitted by the collimated light sources 40 can correspond to different light-guide panels 47 and can be different, wherein the light emitted by all the collimated light sources 49 can be mixed so as to form a white color.

As shown in FIG. 5C, the three collimated light sources 49 provided at the sides of three light-guide panels 47 can each respectively be caused to emit red light, blue light, and green light. The grating structure 43 corresponding to the red sub-pixel can then be provided over the light-guide panel 47 and be reached by the red light; the grating structure 43 corresponding to the blue sub-pixel is can then be provided over the light-guide panel 47 can be reached by the blue light; the grating structure 43 corresponding to the green sub-pixel can then be provided over the light-guide panel 47 and be reached by the green light.

As illustrated in FIG. 5C, the system can be provided with three wave-guide layers which can then be provided as bonding layers 48, These bonding layers 48 can each include a low refractive index can be included among the wave-guide layers. Generally, transparent plastic materials (with a thickness of about 1 μm-200 μm) or film materials (with a thickness of about 0.1 mm-1 mm) with low refractive indices can be utilized.

In some embodiments, the refractive indices of the low-refractive-index bonding layers 48 are smaller than the refractive index of the wave-guide layer.

In some embodiments, the upper and lower surfaces of the bonding layer can be made to be both flat and parallel to each other.

The bonding layer with a low refractive index can then maintain a total reflection of light within its own waive-guide. In some other embodiments, frame bonding can be provided among the wave-guide layers to keep an air layer between the various wave-guide layers.

The refractive indices of the wave-guide layers or the light-guide panels 47 can be larger than the refractive index of the adjacent film layer structures. In this manner, the film layer structures can be influenced by the evanescent wave of the light in the light-guide panel 47, however, the grating structures 43 are not included.

In order to achieve a better effect, the refractive indices can be set as 1.6-2.0, while the wave-guide layers are preferably transparent, however, there are no limitations herein. The thickness of the wave-guide layer can also be set to be about 0.1 mm-2 mm. In selecting suitable thickness, consideration for sufficient light efficiency should be taken into account and consideration for the thinness and lightness of the components need to be balanced.

According to some embodiments of the present disclosure, the optical component 2 can include a lens or a freeform reflective surface.

The lens may be an eyepiece of existing virtual reality (VR) products, the range of the focal length being about 40 mm-80 mm, wherein, 50 mm-60 mm is commonly adopted; the diameter is 30 mm-50 mm, wherein 35 mm-45 mm is commonly adopted; the type of lens may be aspherical lens or convexo-plane lens, the material of the lens may be light-weighted optical resin material or glass material.

A basic imaging light path is illustrated in FIG. 7, which satisfies the following imaging formula:

$$\frac{1}{l} + \frac{1}{-l'} = \frac{1}{f}. \quad (2)$$

In some instances, the virtual image-lens distance, in other words, the distance between the lens and the virtual image plane 6 of the directional display structure, is referred to as an image distance l'. The image distance l' can be, for example, 1 m-6 m. The specific value of l' can be determined according to the balance between the imaging quality and the size of the field of view and the needs of specific application scenarios.

After determining the image distance l', the panel-lens distance, that is, the distance between the directional display structure 1 and the lens, this distance is called object distance l, can be determined through the above formula. It should be appreciated, that the image distance l' is larger than the object distance l, wherein l is almost equal to the focal length of the lens f.

In some embodiments, a reflector can be disposed between the directional display structure and the view zone, and configured to reflect each of the plurality of first sub-images being directionally transmitted to a first view point and reflect each of the plurality of second sub-images being directionally transmitted to a second view point, thereby displaying a three-dimensional image.

The first view point and the second view point can be within a same view zone. The second view point can be different from the first view point In some embodiments, as shown in FIG. 8A, the reflector can be a reflective mask, such as a freeform surface reflective mask applied in Augmented Reality (AR) scenarios.

The freeform surface reflective mask can be made of transparent and light-weighted material such as optical resin, the freeform surface reflective mask may also be made of glass material, the thickness of the freeform surface reflective mask is 1 mm-5 mm. The light path between the freeform surface reflective mask and the directional display structure 1 is equivalent to the coaxial imaging light path shown in FIG. 7, it satisfies the above imaging formula.

Figure 8A:
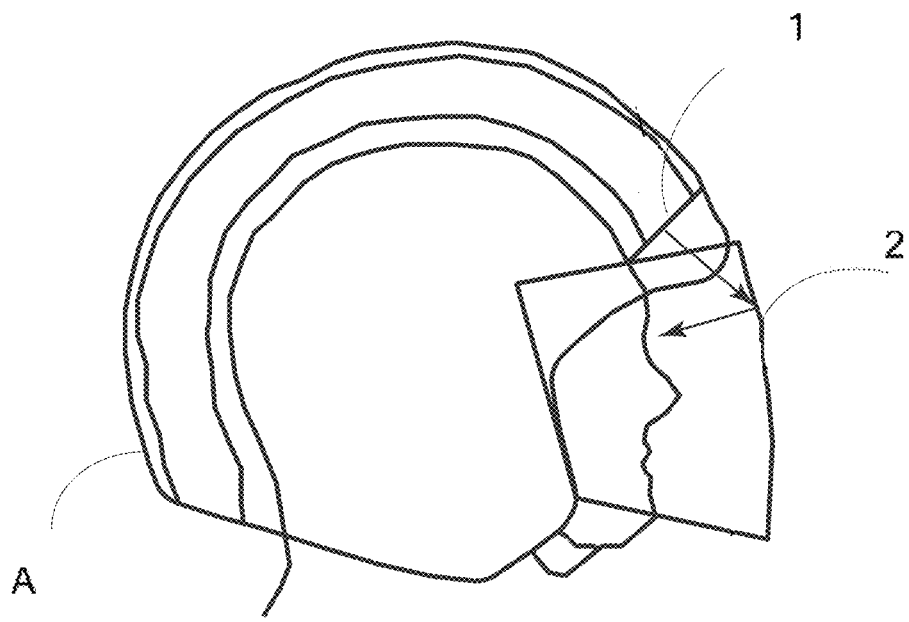
FIG. 8A is a diagram of an application scenario of a display apparatus according to some embodiments of the present disclosure.

As illustrated in in FIG. 8A, an AR helmet A includes the optical component 2, which comprises a freeform surface reflective mask. The freeform surface reflective mask may also be referred to as a freeform surface reflective panel.

The freeform surface reflective mask enables the light path to be off-axis, and it is also compatible with the viewing of the perspective scenes in front of the mask. In order not to influence the viewing of the perspective scenes in front of the mask, the two surfaces of the mask are generally designed to be the same.

In order to improve the reflectivity of the reflective mask to the light emitted from the directional display structure 1 and the transmittance of the light in the environment, the surfaces of the mask may be coated.

In addition, when the brightness level of the display panel of the directional display structure 1 is insufficient, the mask may also decrease the brightness level of the light in the environment.

Figure 8B:
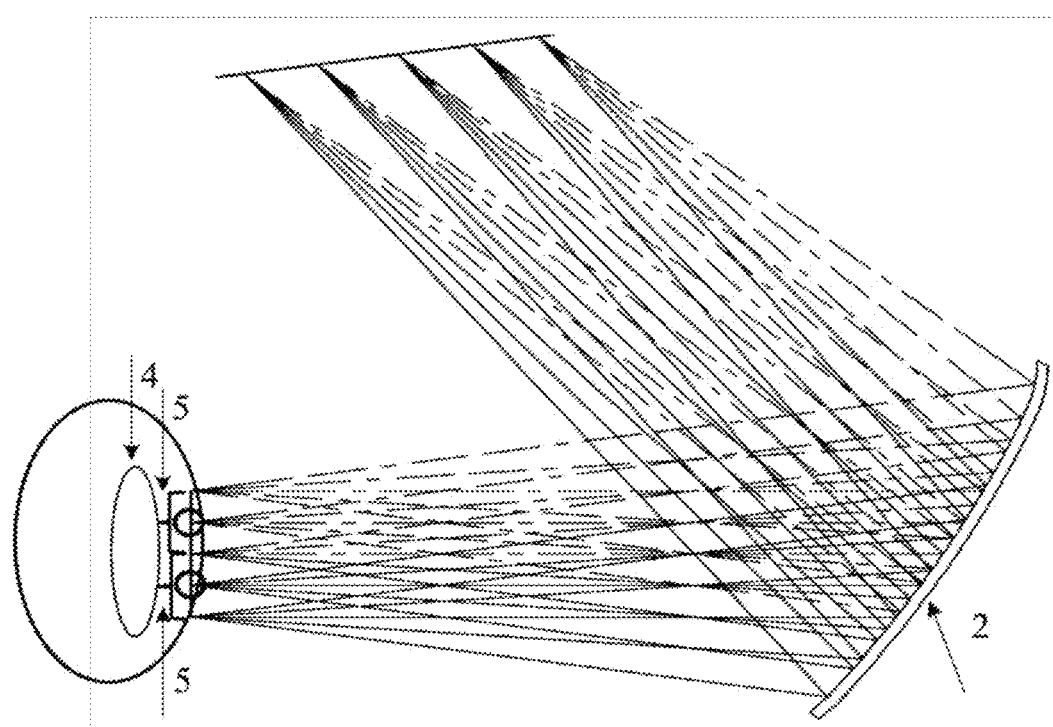
FIG. 8B is a light path diagram of the display apparatus of FIG. 8A.

FIG. 8B illustrates the correspondence relationship between the arrangement of the grating structures and the arrangement of the view points. The optical component 2 in the example of FIG. 8B is a freeform surface reflective mask.

In the following, a lens as the optical component 2 is employed as an example to describe the implementation of light field display of the aforementioned display apparatus.

Figure 9:
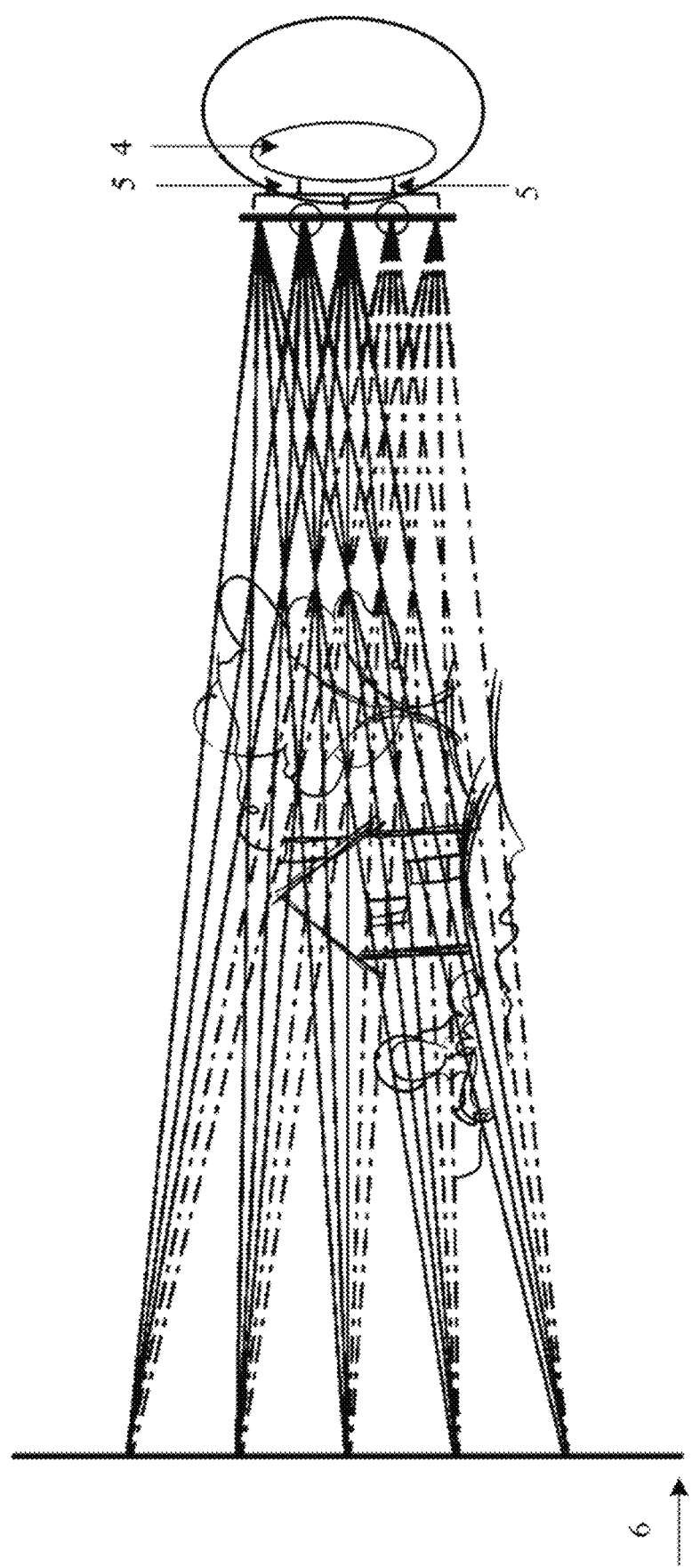
FIG. 9 is a schematic view illustrating an implementation of light field display of a display apparatus according to some embodiments of the present disclosure.

As shown in FIG. 9, the light path is mainly composed of the display panel and the lens, the lens forms an image of the display panel at where the pre-designed virtual image plane is located, because special design is applied to the display panel at this location, the distribution of the light-emitting angles of all sub-pixels of the display panel is no longer a lambert body; instead, the light emits at a smaller divergence angle according to the designed direction, meanwhile, because the enlarging effect of the lens, according to the Etendue Conservation Theorem of optical systems, the sub-pixels over the corresponding virtual image plane of the display panel will emit light with an even smaller divergence angle in a certain direction (generally, through adjusting the design, near collimated emission can be achieved), a series of view points can be formed accurately in front of the eye 3.

Through adjusting the arrangement of the directional emitting sub-pixel array and the arrangement of the view point array and the relationship between them, at least two view points will exist in a single pupil 4 of an eye 3, and the two view points correspond to different sub-pixel groups, sub-pixels corresponding to the same view point are regarded as the same sub-pixel group, so that the two view points can be respectively loaded with different images. In this case, the whole display apparatus is equivalent to a display panel in which light can be accurately controlled and which can generate an accurately modulated light field over the virtual image plane.

In combination with corresponding image rendering technologies, corresponding light field images can be loaded over the sub-pixels corresponding to different view points, as a result, the display apparatus can achieve light field display with monocular focus 3D effect.

In addition, the implementation of the light field display does not rely on changeable outside optical component 2, and can be completely synchronized with the updates of the images of the display panel, and therefore can be advantageous for improving the response speed of the display apparatus. This technology can therefore greatly improve the comfortability of existing VR display products and spread the application of VR technologies.

Figure 10:
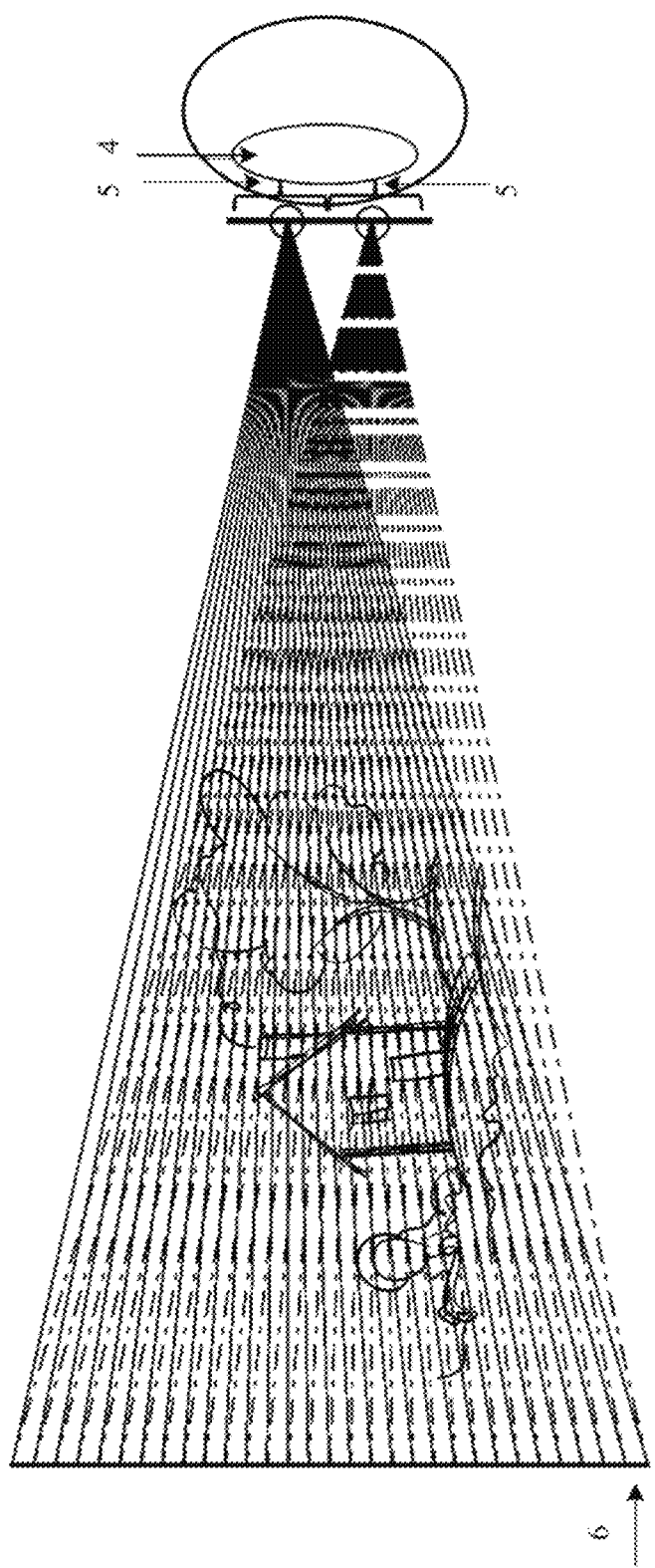
FIG. 10 is a schematic view illustrating another implementation of light field display of a display apparatus according to some embodiments of the present disclosure.

As shown in FIG. 10, the sub-pixels over the virtual image plane corresponding to the display panel emit nearly collimated light, because the size of the virtual image plane and its distance from the eye 3 are both much larger than the diameter 4 of the pupil 3, it can be regarded as nearly collimated, and the light corresponding to the sub-pixel groups corresponding to different view points is respectively converged at different view points.

The light groups corresponding to different view points will intersect in the space between the virtual image of the display panel and the eye 3, these intersecting points form a virtual display scene displayed through the light field display (equivalent to the light emitted by a certain point of the virtual scene).

In the scenes that are farther than the virtual image of the display panel, because the distance between the virtual display scene and the eye 3 is larger than the sensitive range of monocular vision, it may be acceptable to display two-dimensional images according to the methods of conventional VR/AR products, which is not be discussed herein.

In another aspect, a display system is provided, including two display apparatuses of aforementioned embodiments. The two display apparatuses respectively correspond to a left eye and a right eye, they are employed to form respectively at least two first view points 5 located at where the left eye is and at least two first view points 5 located at where the right eye is.

Figure 11:
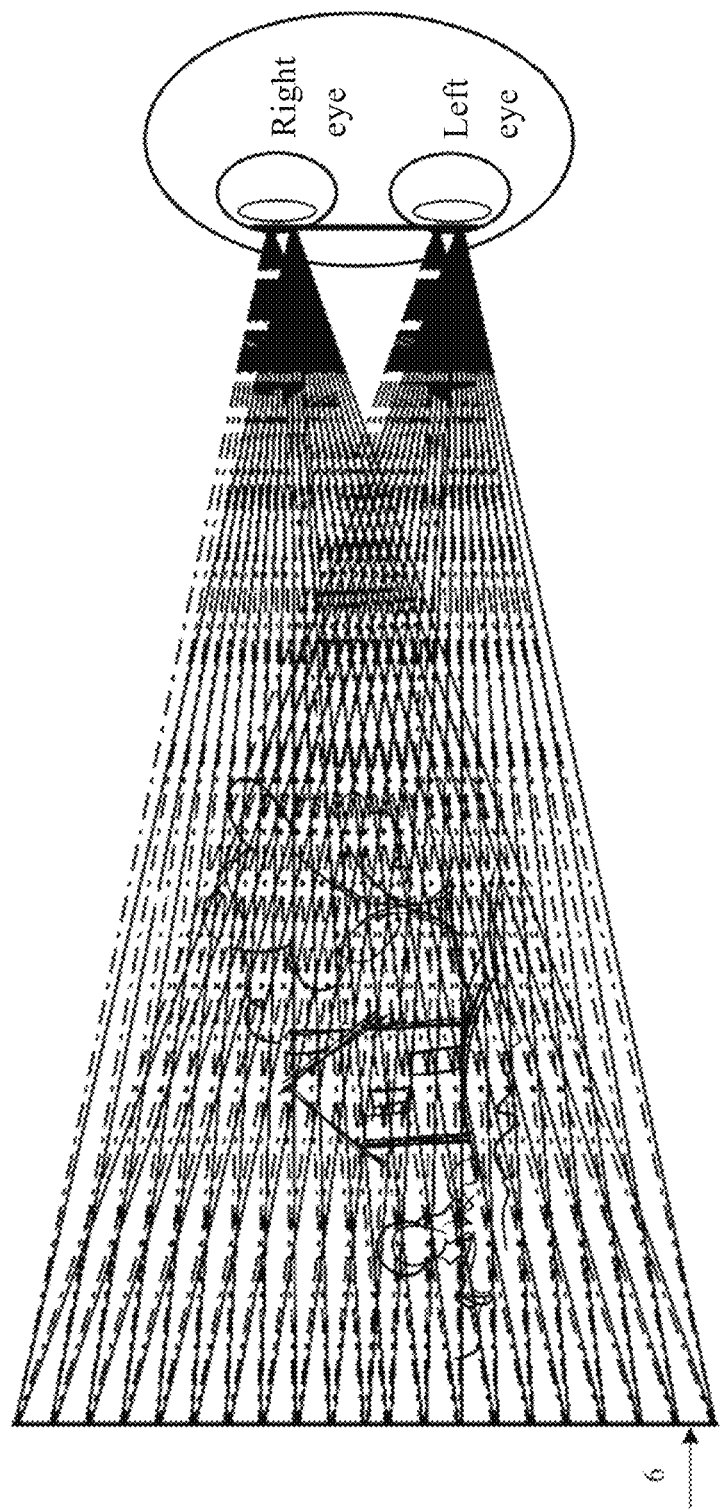
FIG. 11 is a diagram illustrating an implementation of light field display of a display system according to some embodiments of the present disclosure.

According to embodiments of the present disclosure, there is a display apparatuses for each eye, at least two first view points 5 are formed respectively over the left eye and the right eye. As shown in FIG. 11, the light field display as shown in FIG. 9 is applied to both eyes, corresponding light field information is applied to each view point over the left eye and the right eye. By combining with the binocular parallax 3D technologies, for the same scene displayed, through adjusting the monocular focal distance to the binocular vergence distance, the uniformity of the monocular focal distance and the binocular vergence distance is achieved, therefore the problem that viewers could experience dizziness in existing parallax 3D technology is solved.

When the factors such as myopia, astigmatism, hyperopia, presbyopia are taken into consideration in the light field information, corresponding adjustment can be adopted for the loaded light field information, the correction to factors such as myopia, astigmatism, hyperopia, presbyopia can be achieved, the device can be worn directly and there is no need to wear additional glasses.

Figure 12:
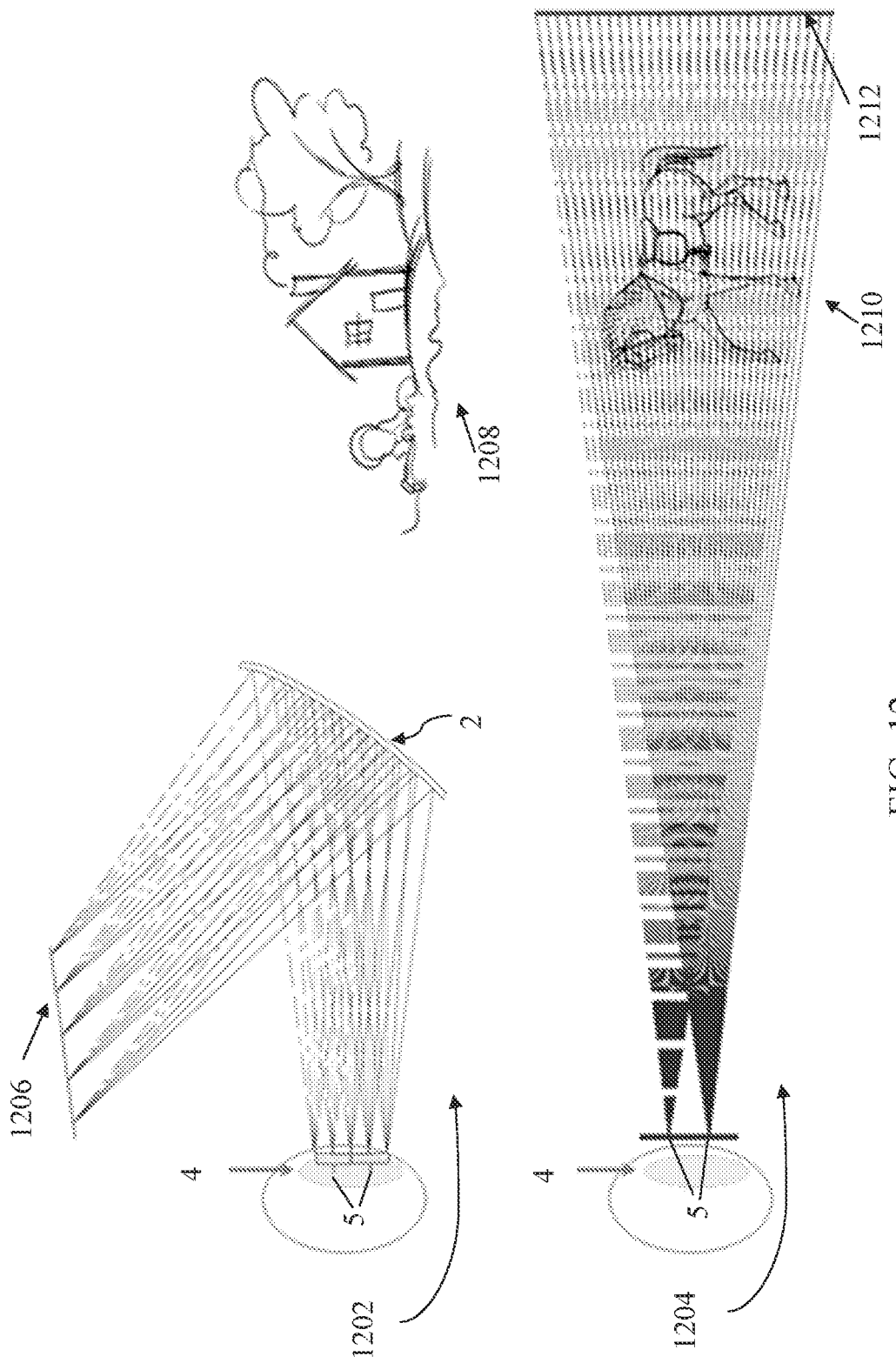
FIG. 12 is a diagram comparing an actual light path and a virtual image light path in the display system according to some embodiments of the present disclosure.

FIG. 12 is a diagram comparing an actual light path 1202 and a virtual image light path 1204 in the display system according to some embodiments of the present disclosure.

In the actual light path 1202, light emitted from the directional display panel 1206 can be reflected by the freeform surface reflective panel 2 toward the user eye. The freeform surface reflective panel 2 can have a controllable transmissivity. For example, the freeform surface reflective panel 2 can be substantially transparent, allowing the actual object 1208 in the real scene to be seen by the user eye(s).

In the virtual light path 1204, a virtual image or virtual scene 1210 can be presented to the user eye(s), as if being displayed by a virtual image 1212 of the directional display panel 1206. The virtual scene 1210 can therefore be imposed onto the actual object 1208. In some implementations, the freeform surface reflective panel 2 can be substantially opaque, thereby allowing the virtual scene 1210 to replace the actual object 1208.

The actual light path 1202 or the virtual light path 1204 can be adjusted to adapt the user's need for vision correction, such that regular vision correction eyewear is no longer needed when using the display system.

In some implementations, the display system further comprises a camera adapted to capture images of the actual object 1208. The captured images of the actual object 1208 can then be displayed with the directional display panel 1206 and the freeform surface reflective panel 2, corrected based on the user's uncorrected eye vision, such that the user does not need to wear correction glasses even when looking at the actual scene.

Figure 13:
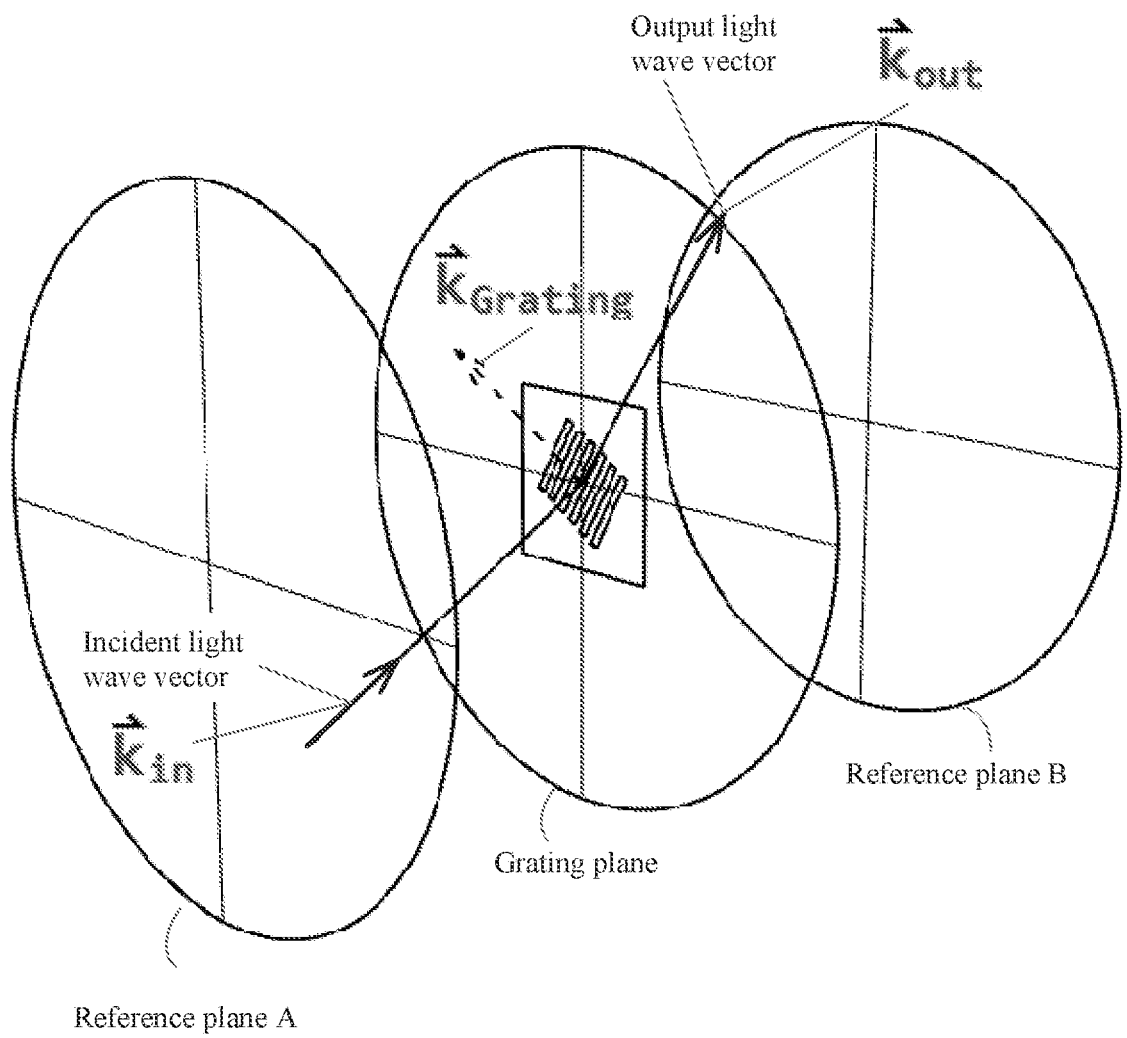
FIG. 13 is a diagram illustrating determination of the grating rotation angle direction and the grating period according to some embodiments.

In some embodiments, with reference to FIG. 13, a grating direction angle and a grating period can be determined based on the following equations:

$$\vec{k}_o = n_o \frac{2\pi}{\lambda} \vec{r}_o \tag{3}$$

$$\vec{k}_{in} = n_{in} \frac{2\pi}{\lambda} \vec{r}_{in} \tag{4}$$

$$\vec{k}_G = \frac{2\pi}{g} \vec{r}_G \tag{5}$$

$$\vec{k}_{in} + m * \vec{k}_G = \vec{k}_o \quad (m = 0, \pm 1, \pm 2 \ldots) \tag{6}$$

Where $\vec{k}_{in/o}$ is the ray wave vector, n is the refractive index of the corresponding medium, λ is the wavelength, $\vec{r}_{n/o}$ is the unit vector describing the direction of the light, and $\vec{k}_G$ is the grating vector, $\vec{r}_G$ is the unit vector of the normal direction of the grating lines, g is the grating period, and m is the diffraction order of the grating, generally taking 1 or −1.

Figure 2:
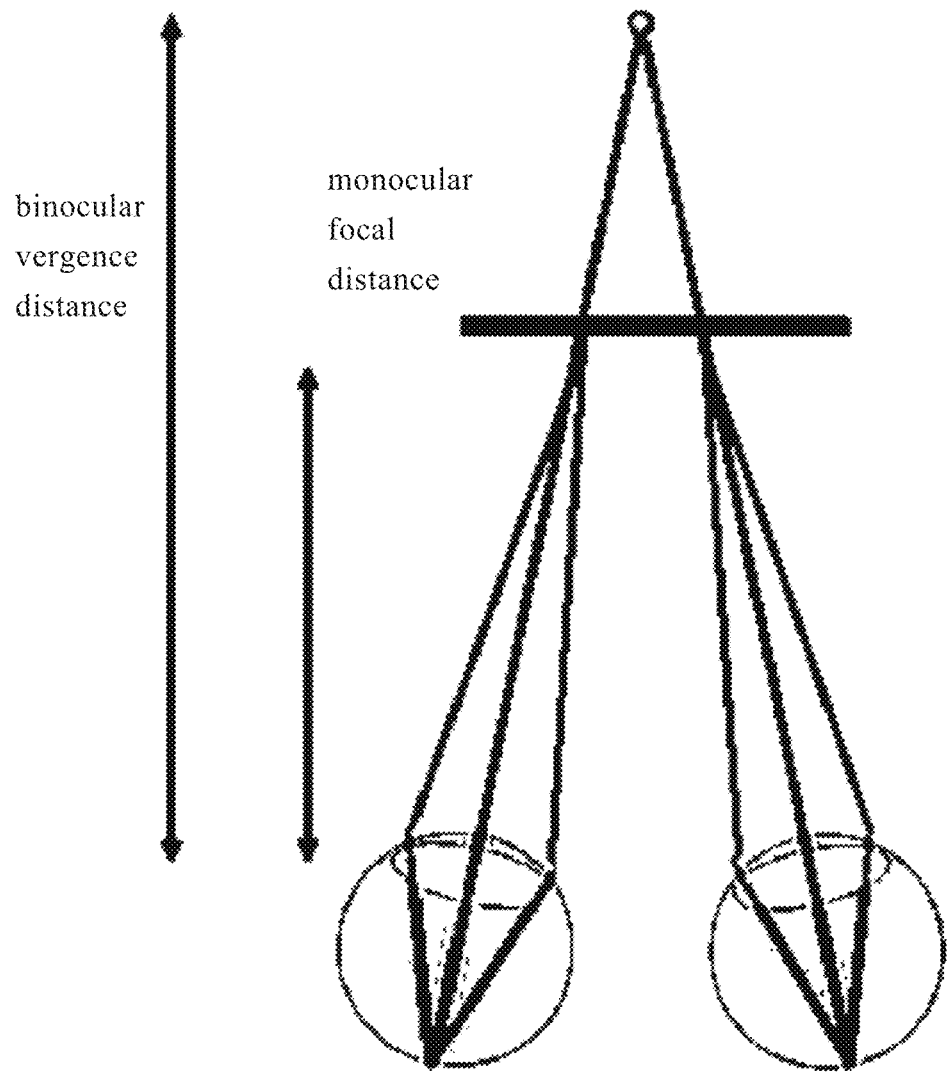
FIG. 2 is a schematic view of a monocular focal point and a binocular vergence point in parallax 3D technologies.

The incident direction $\vec{r}_n$ of the light is determined by the collimated backlight, as illustrated in FIGS. 1 and 2, or the direction of the light propagating in the collimated direction of the waveguide.

The exit direction $\vec{r}_G$ of the light is determined by the center point of the pixel where the grating is located (assuming that the grating is at the center of the pixel), and the position of the view point corresponding to the pixel (pointing from the pixel to the view point, through the imaging system illustrated in FIGS. 1-5).

The amplitude and direction of the grating vector $\vec{k}_G$ can be obtained from the last vector equation (6) shown above.

The period g of the grating and the direction of the rotation angle $$\frac{2\pi}{g}\vec{r}_G$$

can be obtained according to the above equation (5), as illustrated in FIG. 13

In the above equations, $n_n$ is generally the refractive index of the collimated backlight or waveguide (corresponding to the medium where $\vec{k}_{i}$ is located), $n_o$ is the refractive index of air, which is approximately 1.

Figure 14:
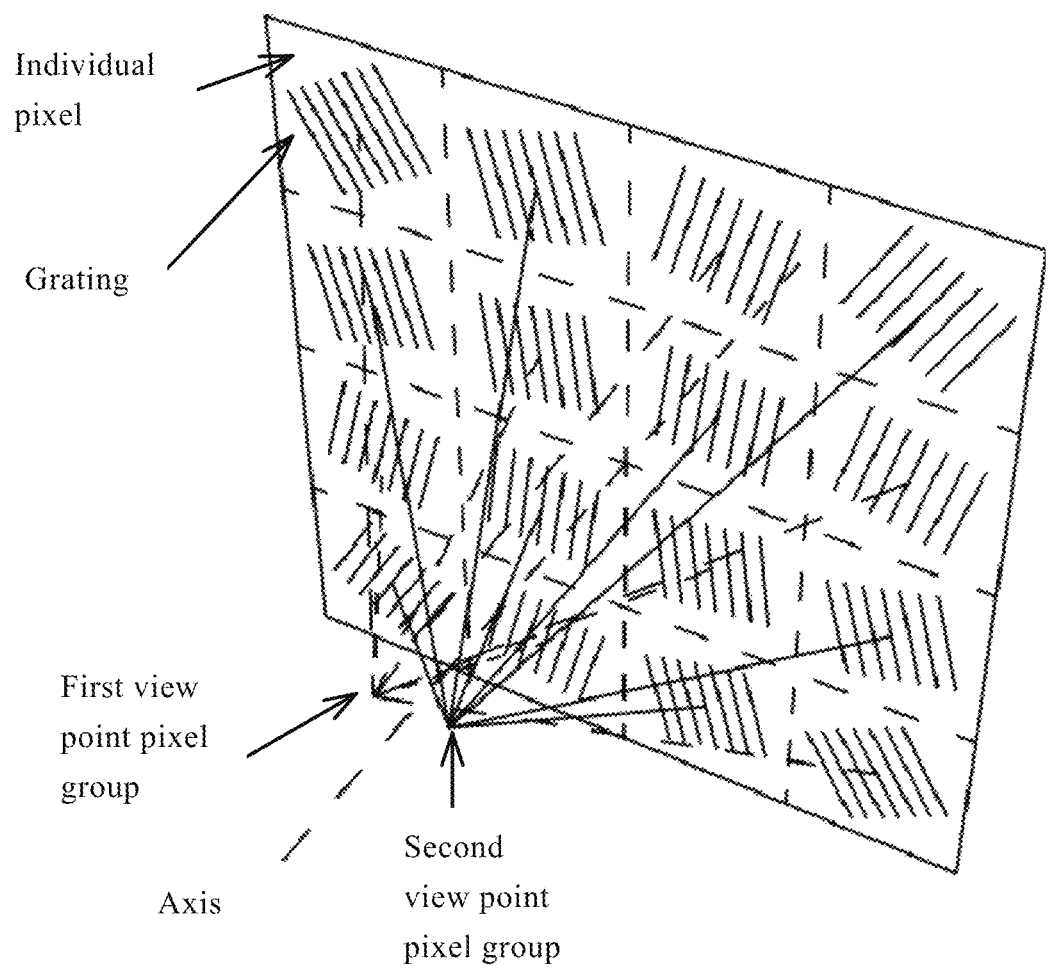
FIG. 14 is a diagram illustrating a panel pixel-grating layout according to some embodiments, using two view points as an example.

A panel pixel-grating arrangement according to some embodiments is illustrated in FIG. 14, where two view points are taken as an example, and each view point corresponds to a group of 8 sub-pixels.

The sub-pixels in a single view point group in FIG. 14 are imaged by the optical system shown in FIGS. 1-5C, and focused to one point in front of the pupil of the user eye, where the bending of the light during imaging is ignored in FIG. 14.

The rotation angle and the period of the grating can therefore be determined by the method described above. It should be noted that the number of pixel arrays and the rotation angle of the grating shown in the drawings are for illustration only and are not limiting.

The grating arrangement can be similar to that of the pixels, and the pixels can be arranged in a lattice matrix arrangement or a triangle/hexagon matrix lattice. The pixels of different view points are generally alternately distributed, and can be adjusted correspondingly in specific implementations.

Figure 15:
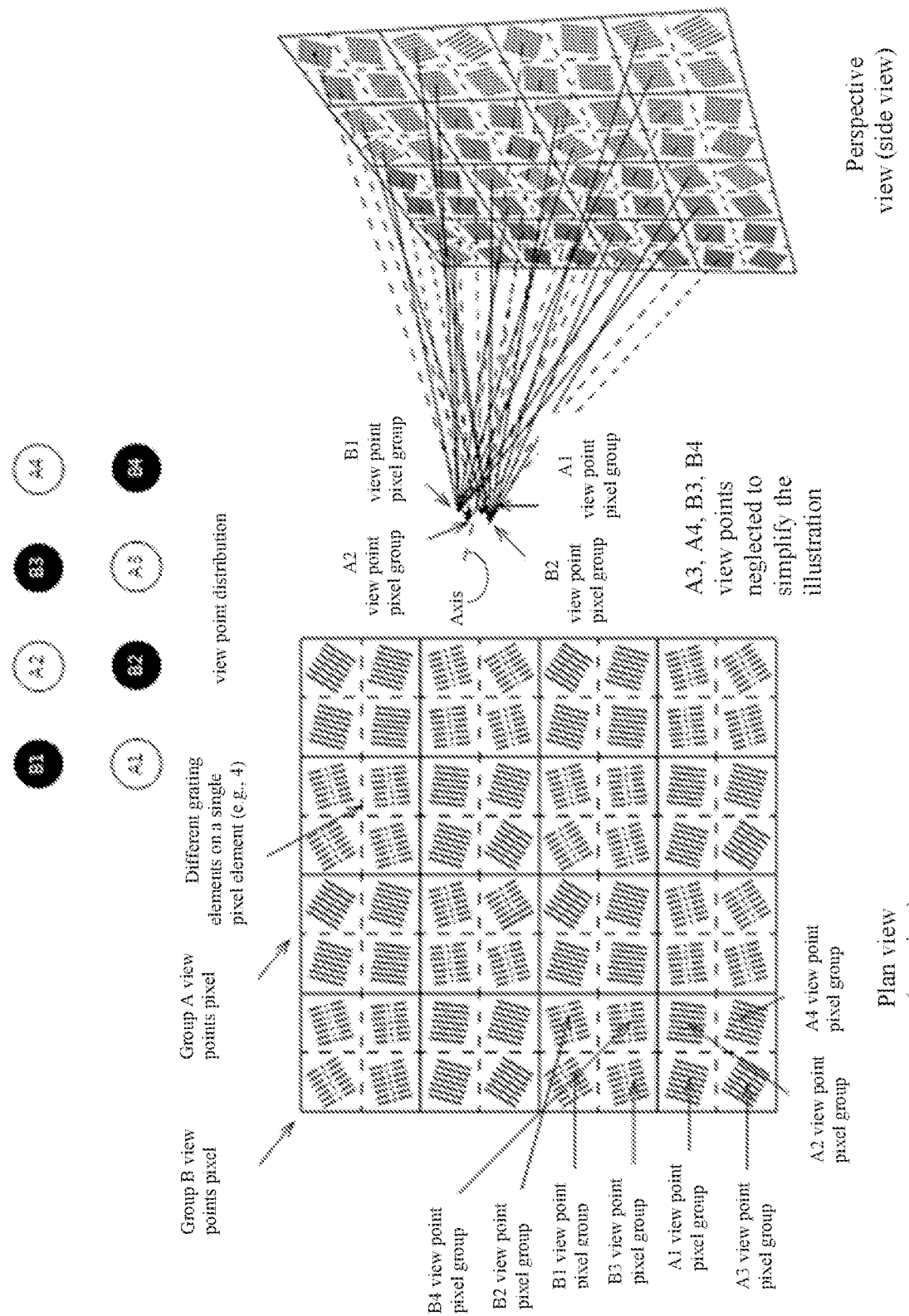
FIG. 15 is a diagram illustrating a panel pixel-grating layout according to some embodiments, using eight view points, grouped into two groups, as an example.

FIG. 15 is a schematic diagram illustrating a panel pixel—grating arrangement, in two different groups. An example of an eight-view-point distribution corresponding to FIGS. 1-7 is provided, where in the design a single pixel opening corresponds to multiple grating elements.

The eight view points are divided into two groups, A and B. The pixels in groups A and B have different light field information, but each pixel opening of A and B itself corresponds to four different gratings, and the four gratings correspond to the same pixel information.

The four sets of gratings are responsible for expanding/copying the information to different view points to enlarge the viewable area of the user eye.

Generally, different view points of A and B itself cannot be adjacent, that is, A and B view points need to be arranged alternately. In addition, the view point information in group A or group B cannot enter a single user eye at the same time, that is, different view points in group A cannot enter the user eye at the same time, and different view points in group B cannot enter the user eye at the same time, but the user eye needs input at the same time information from groups A and B.

As illustrated in FIG. 15, among the grating structures within a same view point group, such as group A or group B, a grating orientation varies gradually between neighboring grating structures. For example, the grating orientation varies by less than 30 degrees, such as less than 20 degrees, or less than 10 degrees.

On the other hand, between the group A and group B, a grating orientation varies substantially abruptly, such as by more than 30 degrees.

According to some embodiments, the first group of view points and the second group of view points are respectively within different view zones.

In order to avoid the error information brought by the reversal of the view information when the user eye moves between the view points, an eye tracking technology can be employed, to refresh the view point information in real time, that is, the view point information of the A group and the B group are exchanged correspondingly to make the correction.

In some embodiments, a camera can be included in the display apparatus or the display system to track the user eye(s).

The image correction can be made by software, or hardware, or a combination thereof. In some embodiments, the control and/or interface software or applications (apps) can be provided in a form of a non-transitory computer-readable storage medium having instructions stored thereon.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more non-transitory computer-readable storage devices or received from other sources.

For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

The devices in this disclosure can include special purpose logic circuitry, e.g., an FPGA (field-programmable gate array), or an ASIC (application-specific integrated circuit).

The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures. For example, the devices can be controlled remotely through the Internet, on a smart phone, a tablet computer or other types of computers, with a web-based graphic user interface (GUI).

A computer program (also known as a program, software, software application, app, script, or code) can be written in any form of programming language, including compiled or interpreted languages, declarative or procedural languages, and it can be deployed in any form, including as a stand-alone program or as a module, component, subroutine, object, or other unit suitable for use in a computing environment.

A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display apparatus, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

Other types of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In an example, a user can speak commands to the apparatus for determining ambient light luminance, to perform various operations.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The features disclosed herein may be implemented as part of a smart home or a smart office design, which may implement individually or integrally various electronic devices in a home or office.

For example, control or display functions in the smart home or smart office may be realized on the display apparatus discussed above, which may be configured as, or part of, a smart television (or connected television, hybrid television, etc.), which may include a processing circuit configured to integrate Internet connectivity with more traditional television programming sources (e.g., received via cable, satellite, over-the-air, or other signals).

The smart television may be physically incorporated into a television set or may include a separate device such as a set-top box, Blu-ray or other digital media player, game console, hotel television system, and other companion devices. A smart television may be configured to allow viewers to search and find videos, movies, photos and other content on the web, on a local cable TV channel, on a satellite TV channel, or stored on a local hard drive.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Those of ordinary skill in the art will also understand that the embodiments described in the specification are just some of the embodiments, and the involved actions and portions are not necessarily all required to realize the functions of the various embodiments.

Various embodiments in this specification have been described in a progressive manner, where descriptions of some embodiments focus on the differences from other embodiments, and same or similar parts among the different embodiments are sometimes described together in only one embodiment.

It should also be noted that in the present disclosure, relational terms such as first and second, etc., are only used to distinguish one entity or operation from another entity or operation, and do not necessarily require or imply these entities having such an order or sequence. It does not necessarily require or imply that any such actual relationship or order exists between these entities or operations.

Moreover, the terms "include," "including," or any other variations thereof are intended to cover a non-exclusive inclusion such that a process, method, article, or apparatus that comprises a list of elements including not only those elements but also those that are not explicitly listed, or other elements that are inherent to such processes, methods, goods, or equipment.

In the case of no more limitation, the element defined by the sentence "includes a . . . " does not exclude the existence of another identical element in the process, the method, the commodity, or the device including the element.

The foregoing has provided a detailed description with regard to a display apparatus and a display system that achieve the uniformity of monocular focal distance and binocular vergence distance according to some embodiments of the present disclosure. Specific examples are used herein to describe the principles and implementations of some embodiments. The description is only used to help understanding some of the possible methods and concepts. Meanwhile, those of ordinary skill in the art may change the specific implementation manners and the application scope according to the concepts of the present disclosure. The contents of this specification therefore should not be construed as limiting the disclosure.

In the descriptions, with respect to device(s), group(s), structure(s), system(s), etc. in some occurrences singular forms are used, and in some other occurrences plural forms are used in the descriptions of various embodiments. It should be noted, however, the single or plural forms are not limiting but rather are for illustrative purposes. Unless it is expressly stated that a single device, group, or system etc. is employed, or it is expressly stated that a plurality of devices, groups, or systems etc. are employed, the device(s), group(s), structure(s), system(s), etc. can be singular, or plural.

Based on various embodiments of the present disclosure, the disclosed apparatuses, devices, and methods may be implemented in other manners.

Dividing the terminal or device into different "portions," "units," "components," etc., merely reflect various logical functions according to some embodiments, and actual implementations can have other divisions of "portions," "units," or "components" realizing similar functions as described above, or without divisions. For example, multiple portions, units, components may be combined or can be integrated into another system. In addition, some features can be omitted.

Those of ordinary skill in the art will appreciate that the modules, circuits, units, portions, or components in the devices provided by various embodiments described above can be configured in the one or more devices described above.

They can also be located in one or multiple devices that is (are) different from the example embodiments described above or illustrated in the accompanying drawings. For example, the modules, circuits, units, portions, or components in various embodiments described above can be integrated into one module or divided into several sub-modules.

It is noted that the various device components, units, blocks, or portions may have modular configurations, or are composed of discrete components, but nonetheless may be referred to as "modules" in general. In other words, the "modules" or "units" referred to herein may or may not be in modular forms.

The order in which various embodiments described above are only for the purpose of illustration, and do not represent preference of embodiments.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation to encompass such modifications and equivalent structures.

The invention claimed is:

1. A display system comprising two three-dimensional display apparatuses each configured to provide a plurality of view points at a view zone, each of the two three-dimensional display apparatuses comprising:
   a directional display structure comprising: a plurality of first sub-pixels configured to display a plurality of first sub-images, and a plurality of second sub-pixels configured to display a plurality of second sub-images;
a plurality of grating structures comprising a plurality of first grating structures configured to perform diffraction of light such that the plurality of first sub- images are directionally transmitted, and a plurality of second grating structures configured to perform diffraction of light such that the plurality of second sub-images are directionally transmitted;
a reflective mask between the directional display structure and the view zone, and configured to reflect each of the plurality of first sub-images being directionally transmitted to a first view point and reflect each of the plurality of second sub-images being directionally transmitted to a second view point, thereby displaying a three-dimensional image, the first view point and the second view point being within a same view zone, the second view point being different from the first view point;
wherein
the two three-dimensional display apparatuses respectively correspond to a left eye and a right eye of a user; and
the display system further comprises a camera configured to track the user eye to facilitate refreshing view point information in real time to thereby correcting error information resulting from the user eye movement between view points;
wherein:
the display apparatuses are configured to adapt to the user's uncorrected eye vision;
the directional display structure further comprises a display panel including at least one of a liquid crystal display (LCD) panel, a light-emitting diode (LED) display panel, or an organic LED (OLED) display panel; and
a monocular focal distance of one of the two display apparatuses corresponding to the left eye or right eye and a binocular vergence distance of the two display apparatuses are substantially equal.

2. The display system of claim 1, wherein the display panel comprises the plurality of first sub-pixels and the plurality of second sub-pixels, wherein the plurality of grating structures are disposed at a light-emitting side of the display panel; and
wherein the directional display structure further comprises a collimated backlight structure configured to provide collimated light for the display panel.

3. The display system of claim 1, wherein the display panel comprises the first plurality of sub-pixels and the second plurality of sub-pixels; and
wherein the directional display structure further comprises a collimated backlight structure configured to provide collimated light for the display panel;
wherein the plurality of grating structures are disposed between the display panel and the collimated backlight structure.

4. The display system of claim 3, wherein:
the collimated backlight structure is a side-entry collimated light structure including a light-guide panel and a collimated light source disposed along a side of the light guide panel; and
the plurality of grating structures are disposed at a light-emitting side of the light-guide panel.

5. The display system of claim 3, wherein the collimated backlight structure includes:
at least two light-guide panels arranged in layers; and
a plurality of collimated light sources respectively placed along opposing sides of each light-guide panel;
wherein:
the plurality of grating structures are provided at a light-emitting surface of each light-guide panel;
a plurality of colors of the light emitted by the collimated light sources that correspond to different light guide panels are different; and
the plurality of colors of light emitted by the plurality of the collimated light sources are capable of being mixed into white light.

6. The display system of claim 5, wherein the collimated backlight structure further comprises a low-refractive-index bonding layer configured to bond adjacent light-guide panels.

7. The display system of claim 1, wherein:
the plurality of first sub-pixels are in one-to-one correspondence with the plurality of first grating structures; and
the plurality of second sub-pixels are in one-to-one correspondence with the plurality of second grating structures.

8. The display system of claim 1, wherein each of the plurality of first sub-pixels and each of the plurality of second sub- pixels are arranged alternately.

9. The display system of claim 1, wherein the plurality of view points are arranged in a form of a straight line, a cross, a rectangle, or a star.

10. The display system of claim 2, wherein:
the display panel includes an upper polarizer configured at the light-emitting side of the display panel; and
the plurality of grating structures are located at a light-emitting side or a light incident side of the upper polarizer.

11. The display system of claim 10, wherein:
the display panel further comprises a lower polarizer disposed adjacent to the plurality of first and second sub-pixels; and
the lower polarizer is configured as a substrate of the display panel to thereby reduce a need for a glass substrate.

12. The display system of claim 1, wherein:
the plurality of view points include a first group of view points and a second group of view points;
among the grating structures corresponding to the first group of view points, a grating orientation varies gradually between neighboring grating structures; and
between the first group of view points and the second group of view points, a grating orientation varies substantially abruptly.

13. The display system of claim 12, wherein the first group of view points and the second group of view points are respectively within different view zones.

14. A three-dimensional display apparatus configured to provide a plurality of view points at a view zone, the three-dimensional display apparatus comprising:
a directional display structure comprising: a plurality of first sub-pixels configured to display a plurality of first sub-images, and a plurality of second sub-pixels configured to display a plurality of second sub-images;
a plurality of grating structures comprising a plurality of first grating structures configured to perform diffraction of light such that the plurality of first sub- images are directionally transmitted, and a plurality of second grating structures configured to perform diffraction of light such that the plurality of second sub-images are directionally transmitted;

a reflective mask between the directional display structure and the view zone, and configured to reflect each of the plurality of first sub-images being directionally transmitted to a first view point and reflect each of the plurality of second sub-images being directionally transmitted to a second view point, thereby displaying a three-dimensional image, the first view point and the second view point being within a same view zone, the second view point being different from the first view point;

the plurality of view points include a first group of view points and a second group of view points;

among the grating structures corresponding to the first group, a grating orientation varies gradually between neighboring grating structures; and between the first group and the second group, a grating orientation varies substantially abruptly; and a grating orientation angle and a grating period are determined based on:

$$\vec{k}_{out} = n_{out}\frac{2\pi}{\lambda}\vec{r}_{out};$$

$$\vec{k}_{in} = n_{in}\frac{2\pi}{\lambda}\vec{r}_{in};$$

$$\vec{k}_{Grating} = \frac{2\pi}{g}\vec{r}_{Grating};$$

$$\vec{k}_{in} + m*\vec{k}_{Grating} = \vec{k}_{out} \ (m = 0, \pm 1, \pm 2 \ ... \ );$$

$$\vec{k}_{in/out}$$

is a ray wave vector, n is a refractive index of a corresponding medium, λ is a wavelength, $$\vec{r}_{in/out}$$

is a unit vector describing a direction of the light, and $$\vec{k}_{Grating}$$

is a grating vector, $$\vec{r}_{Grating}$$

is a unit vector of a normal direction of grating lines, g is the grating period, and m is a diffraction order of the grating.

15. The display system of claim 1, wherein:
each of the plurality of first sub-pixels corresponds to at least two of the plurality of first grating structures;
the at least two of the plurality of first grating structures are configured to perform diffraction of light from one of the plurality of first sub-pixels such that a first sub-image displayed by the one of the plurality of first sub-pixels is transmitted to different view points;
each of the plurality of second sub-pixels corresponds at least two of the plurality of second grating structures;
the at least two of the plurality of second grating structures are configured to perform diffraction of light from one of the plurality of second sub-pixels such that a second sub-image displayed by the one of the plurality of second sub-pixels is transmitted to different view points.

16. The display system according to claim 15, wherein:
at least two view points exist in a single pupil of an eye, the at least two view points corresponding to different associated sub-pixel groups;
different images are loaded for a set of primary first view points;
a common image is loaded for an adjacent set of secondary first view points; and
the display apparatus further comprises an optical component with an adjustable transmissivity, including a lens or a freeform surface reflective panel.

17. The display system according to claim 2, wherein:
the light emits at a divergence angle according to a designed direction;
the optical component forms a virtual image of the display panel over a virtual image plane;
a divergence angle of the light at the virtual image plane is smaller than a divergence angle of the light at the display panel;
the display panel includes a color film layer; and
the plurality of grating structures are placed at a light-emitting side of the color film layer.

18. The display system of claim 1, wherein the camera is further configured to capture images of an actual scene, wherein the directional display structure is configured to display both the captured images of the actual scene and a virtual image.

* * * * *